BUFFER PROCESSOR I/O OPTION

Filed Aug. 10, 1964 14 Sheets-Sheet 1

INVENTOR.
CARL W. EHRMAN
BY
Griffin and Stokes
ATTORNEYS

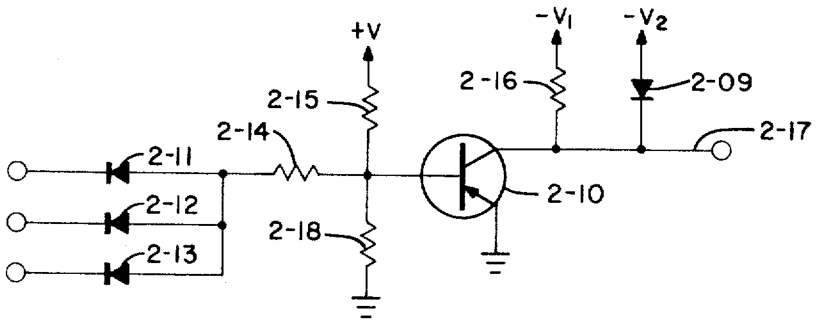
Fig. 2a
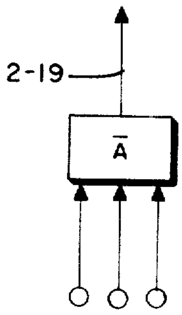
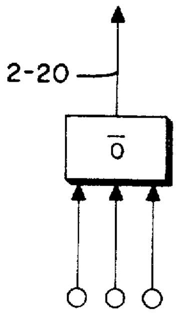
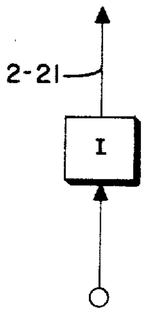
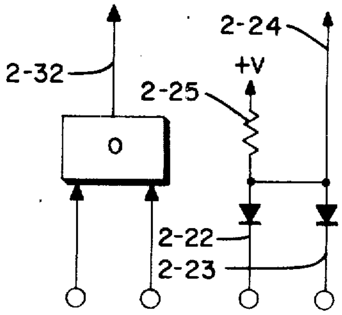
Fig. 2b Fig. 2c Fig. 2d Fig. 2e
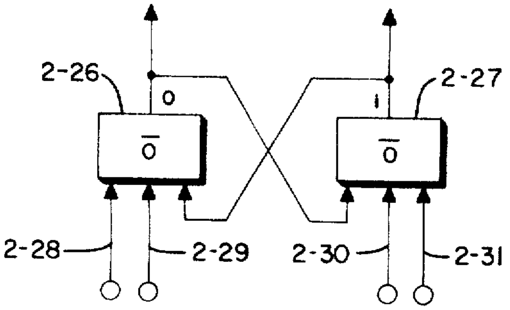
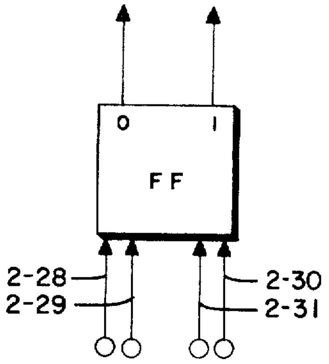
Fig. 2f Fig. 2g Nov. 14, 1967 C. W. EHRMAN 3,353,156

BUFFER PROCESSOR I/O OPTION

Filed Aug. 10, 1964 14 Sheets-Sheet 3

BUFFER PROCESSOR I/O OPTION

Filed Aug. 10, 1964

14 Sheets-Sheet 5

Nov. 14, 1967 C. W. EHRMAN 3,353,156

BUFFER PROCESSOR I/O OPTION

Filed Aug. 10, 1964 14 Sheets-Sheet 6

BUFFER PROCESSOR I/O OPTION

Filed Aug. 10, 1964

Nov. 14, 1967 C. W. EHRMAN 3,353,156

BUFFER PROCESSOR I/O OPTION

Filed Aug. 10, 1964 14 Sheets-Sheet 14

United States Patent Office 3,353,156

Patented Nov. 14, 1967

3,353,156

BUFFER PROCESSOR I/O OPTION

Carl W. Ehrman, Spring Lake Park, Minn., assignor to Sperry Rand Corporation, New York, N.Y., a corporation of Delaware Filed Aug. 10, 1964, Ser. No. 388,468

18 Claims. (Cl. 340—172.5)

ABSTRACT OF THE DISCLOSURE

This system provides input/output controls for transferring data between a data processor memory and a communications line. The memory is of conventional addressable word oriented memory. The communications line can receive or transmit only one binary bit at a time. On input to the memory from the communications line, succeeding bits in a word are stored at corresponding locations in succeeding addresses in memory. For example, a seven bit binary word may be received one bit at a time with the first bit being stored in the low order bit position of one memory address, the second bit being stored in the low order bit position of the next address, and so forth until the lower order bit positions of seven memory locations have been filled. Readout from the memory to the communications line takes place in a similar manner. The memory is addressed seven times with a word being read out of the memory to the memory buffer register for each address. Only one bit position of the buffer register is sampled for each word entered in the buffer register and the sampled bit is applied to the communications line. The arrangement permits serial to parallel or parallel to serial conversion without the use of the conventional shift register. Once data is entered into the memory internal programming is employed to assemble the bits of a particular word from the various addresses into one word location. In like manner, programming is employed to disassemble a word and place one bit in each of several locations prior to transfer of a word from the memory of the communications line.

The present invention relates to means whereby a central data processor operating with multibit information words in the parallel mode may be connected directly to a remote, digital peripheral unit operating in the serial bit mode without requiring the use of a complicated communications control unit. In particular, means are provided responsive to a predetermined computer stored program, and independent of hardware such as shift registers or the like, to accomplish the serialization of data to and from a system utilizing a parallel bit transfer of information words.

Present day high speed computer and other data processing systems often employ what has been called a parallel mode of operation wherein all bits of a multibit data word or instruction word are transferred and operated upon simultaneously. Although this mode requires additional equipment as compared to systems wherein the information word bits are transferred serially, i.e. successively on a single communications conductor, the decrease in operating times more than compensates for the duplication of communications channels. For the most part, said parallel computer systems transfer data in said parallel mode to and from external peripheral units, which means either that a said peripheral unit must also have a parallel mode of operation, or there must be an intervening Input/Output unit for accomplishing a translation from parallel to serial operation, and vice versa. The latter situation is particularly true when using data subsets such as are exemplified by the Western Electric Company data phones Models 201A or 202B. For this environment, information is transferred between the external subset and a central computer system via a common carrier telephone line in a serial mode of operation, i.e., a data word to and from the external subset has its bits transferred sequentially over said single bit communications channel.

The present invention provides means for modifying any one of a number of well known parallel mode computer systems to easily accept or transmit serialized data information to or from an external subset of this nature, primarily by the use of programming techniques in conjunction with a small amount of specialized circuitry responsive to said program. The invention, as disclosed herein, is particularly adapted in giving this capability to a small scale computer system disclosed in pending application Serial No. 207,253, filed July 3, 1962 by Harry D. Wise, hereafter referred to as application A. However, the novel principles behind the present invention may be easily incorporated or provided for in most any general purpose computer operating in the parallel mode, and thus is not to be restricted in its application to the system in the above identified application A. In general, in a system equipped with the present invention, nearly all of the communication system logical functions normally performed by a special parallel-to-serial or serial-to-parallel converting unit can now be provided for by the internal programming of the computer system. This gives the modified system the capability of accommodating party line and non-party line communications, with any desired degree of error checking, format control, etc. while requiring a minimum of hardware expense. The operation basically is to utilize only one predetermined bit position in each of a plurality of sequentially located memory address locations in the internal computer high speed memory unit as either the sources or the receivers, respectively, of data bits serially transmitted to or from the external data subset unit. The remaining bit positions of each said memory address location are not used for this input or output operation, even though they are referenced as usual by the normal computer memory read and write access circuits. Thus, although the computer system continues to operate in the parallel mode with regard to reading and writing a multibit information word from any one of its address storage locations, only one information bit position of each said reference word is actually sent to the data subset for a Send operation, or alternatively is the value of a bit received from the data subset. Thus, a multibit data word serially transmitted to the subset is comprised of bits each coming from the same predetermined bit position in subsequentially located computer memory words. Likewise, a multibit data word serially transmitted from the subset has its bits stored in the same predetermined bit position but in different sequential memory address locations. The actual control of the memory read-write operation for sequentially addressing the computer memory in order to send is under control of repeat instruction control units often found in many general purpose systems, particularly as found in the system dislcosed in application A above.

Therefore, it is one object of the present invention to provide means for accomplishing serial-to-parallel and parallel-to-serial translation of data bits between an external subset operating in the serial transfer mode and a computer or processor operating in the parallel transfer mode, without need for a shift register or the like.

Another object of the present invention is to provide a novel input-output communications control unit having but one single bit buffer storage stage for use as an interface unit between a parallel operating computer and a serial operating peripheral unit.

These and other objects of the present invention will become apparent during the course of the following description to be read in view of the drawings, in which:

FIGURES 2A through 2G show logic symbols employed in the control circuits of succeeding figures;

Figure 6A:
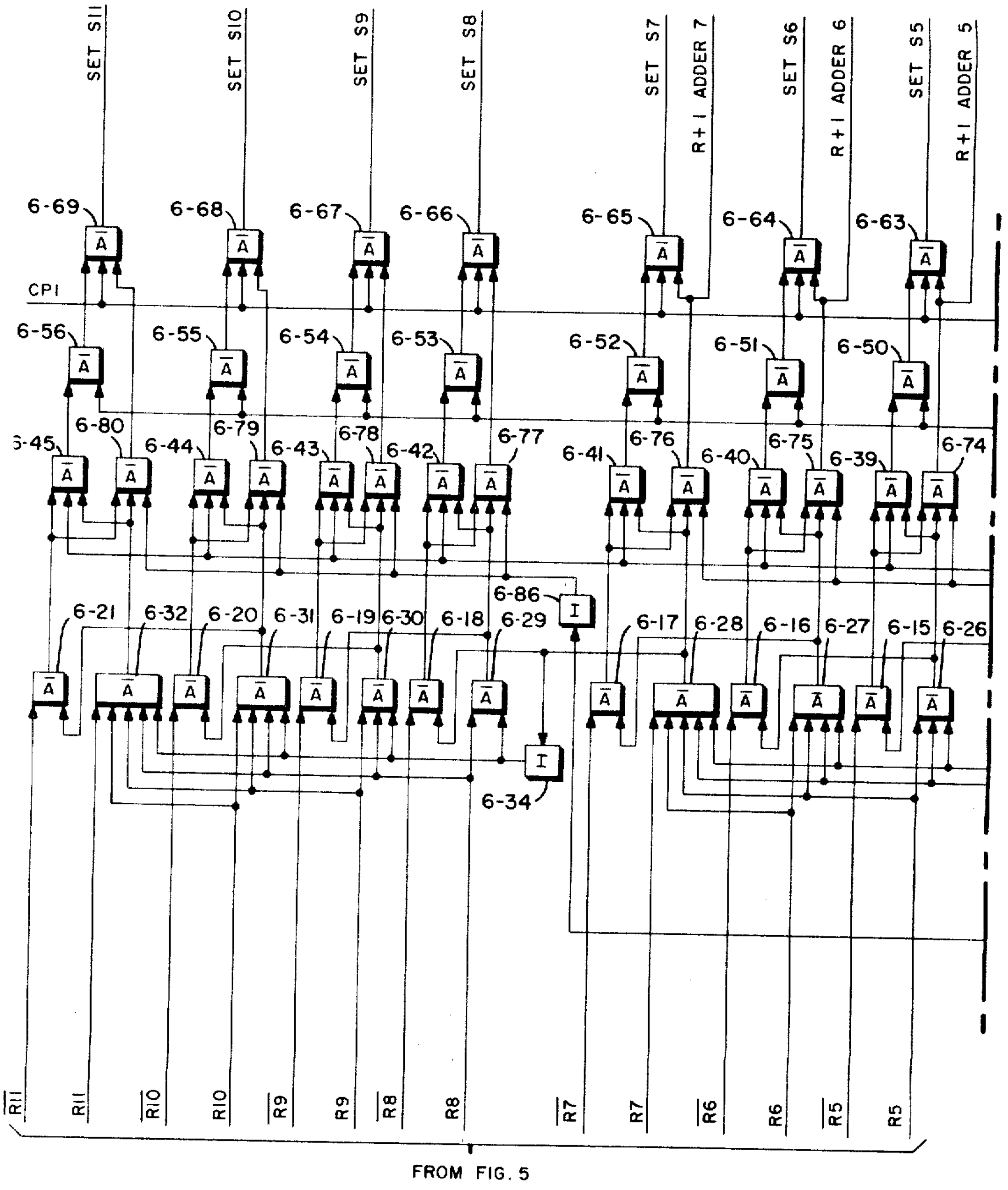
Figure 6B:
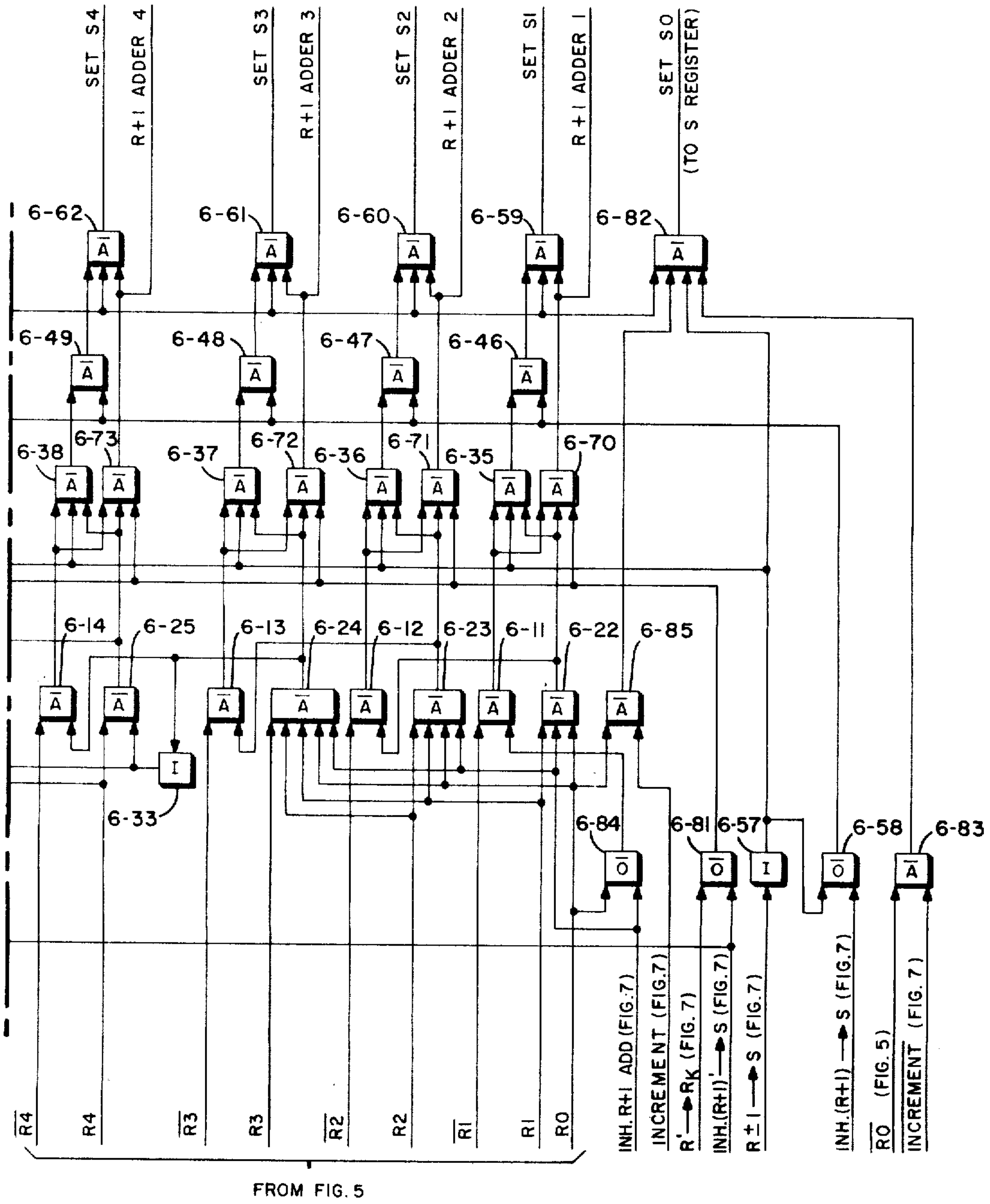
Figure 7A:
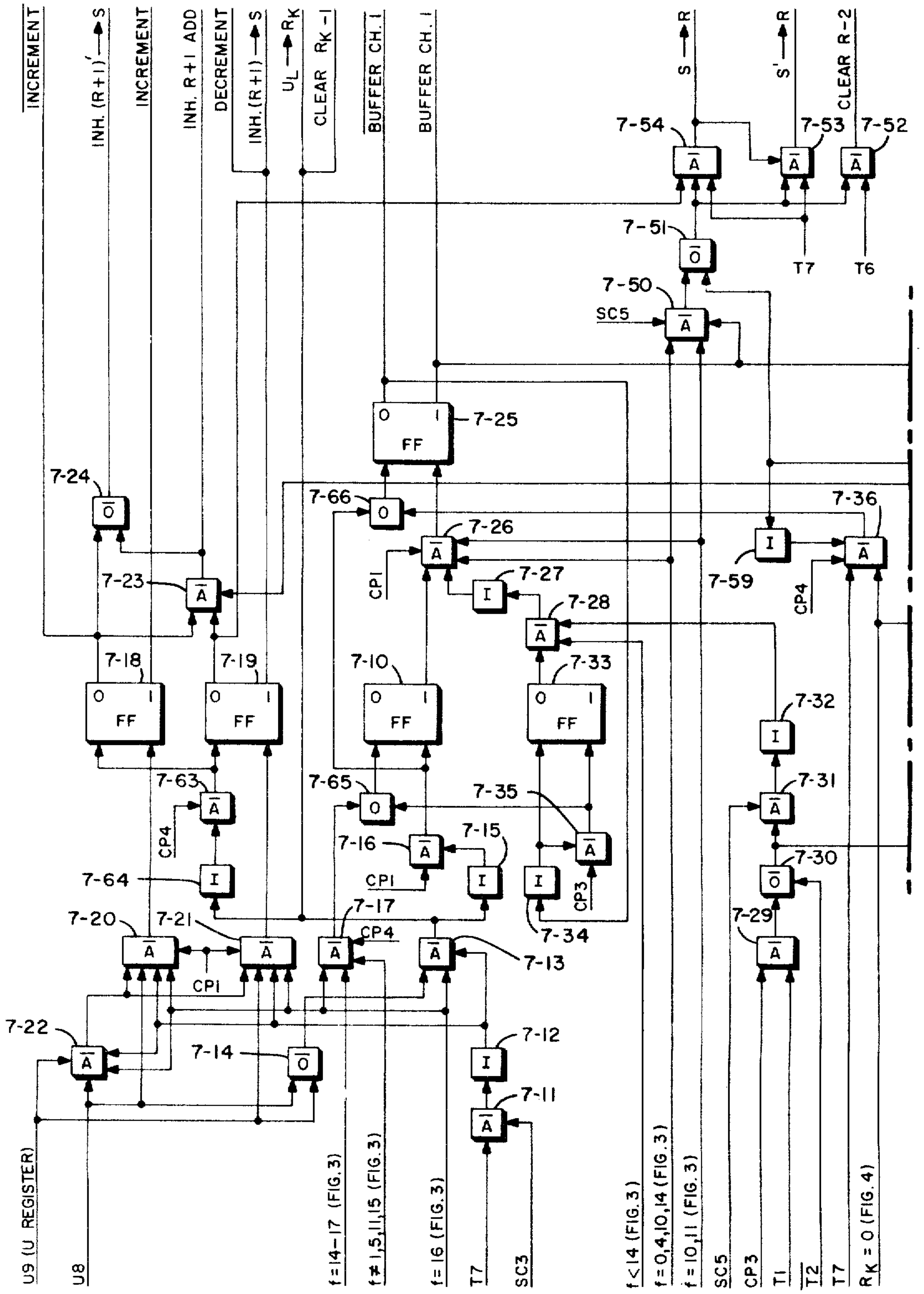
Figure 7B:
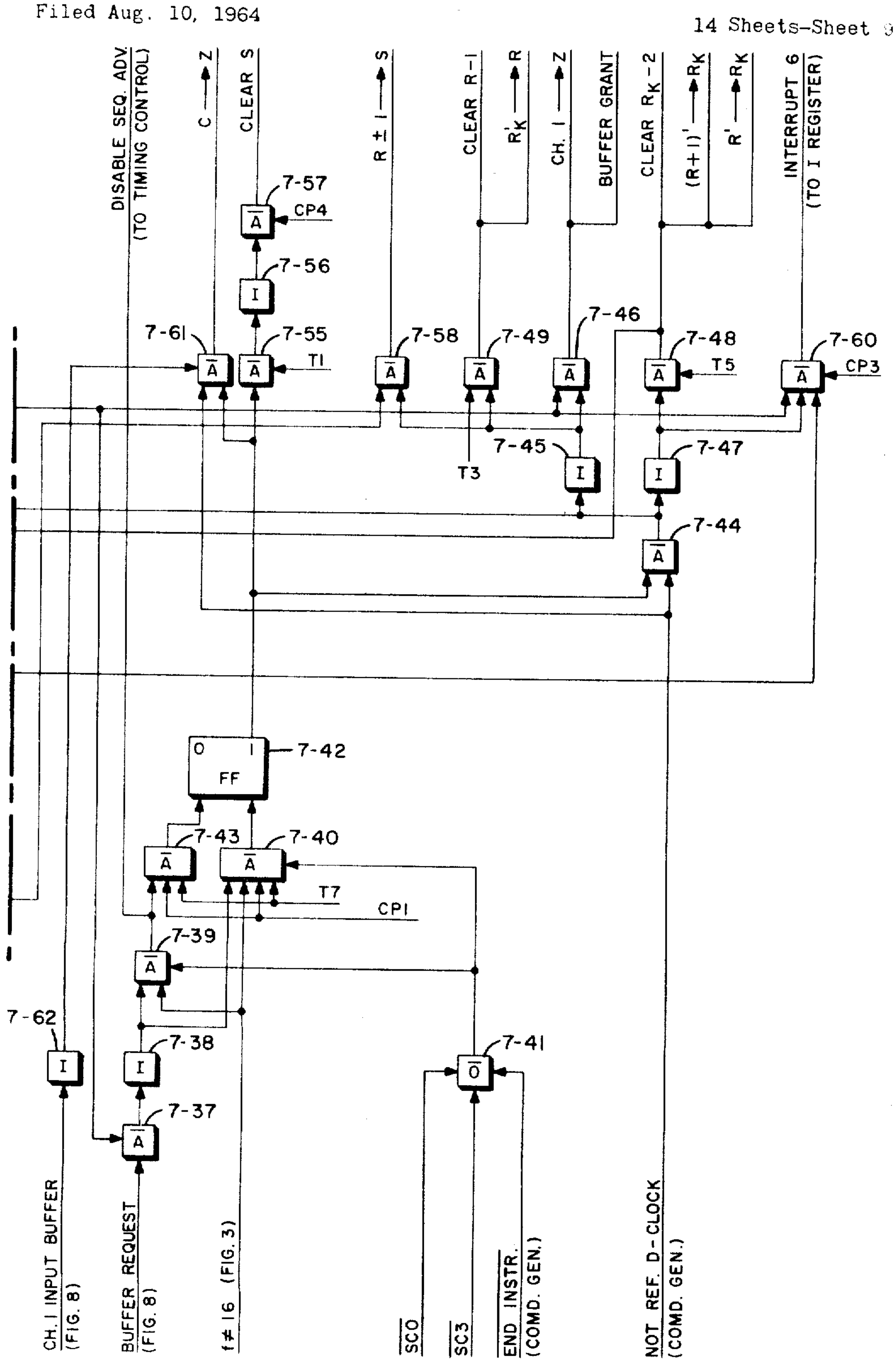
Figure 8A:
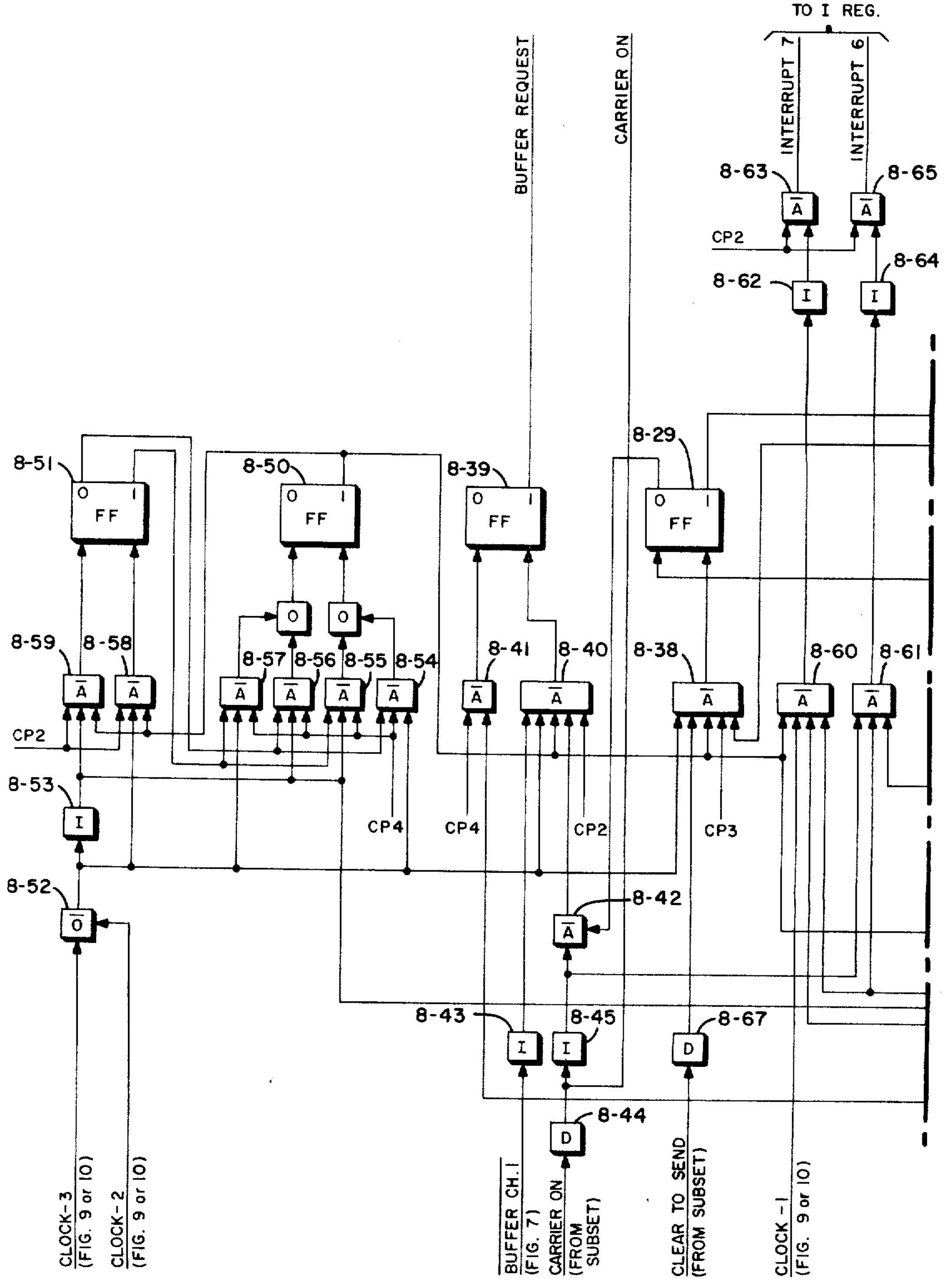
Figure 8B:
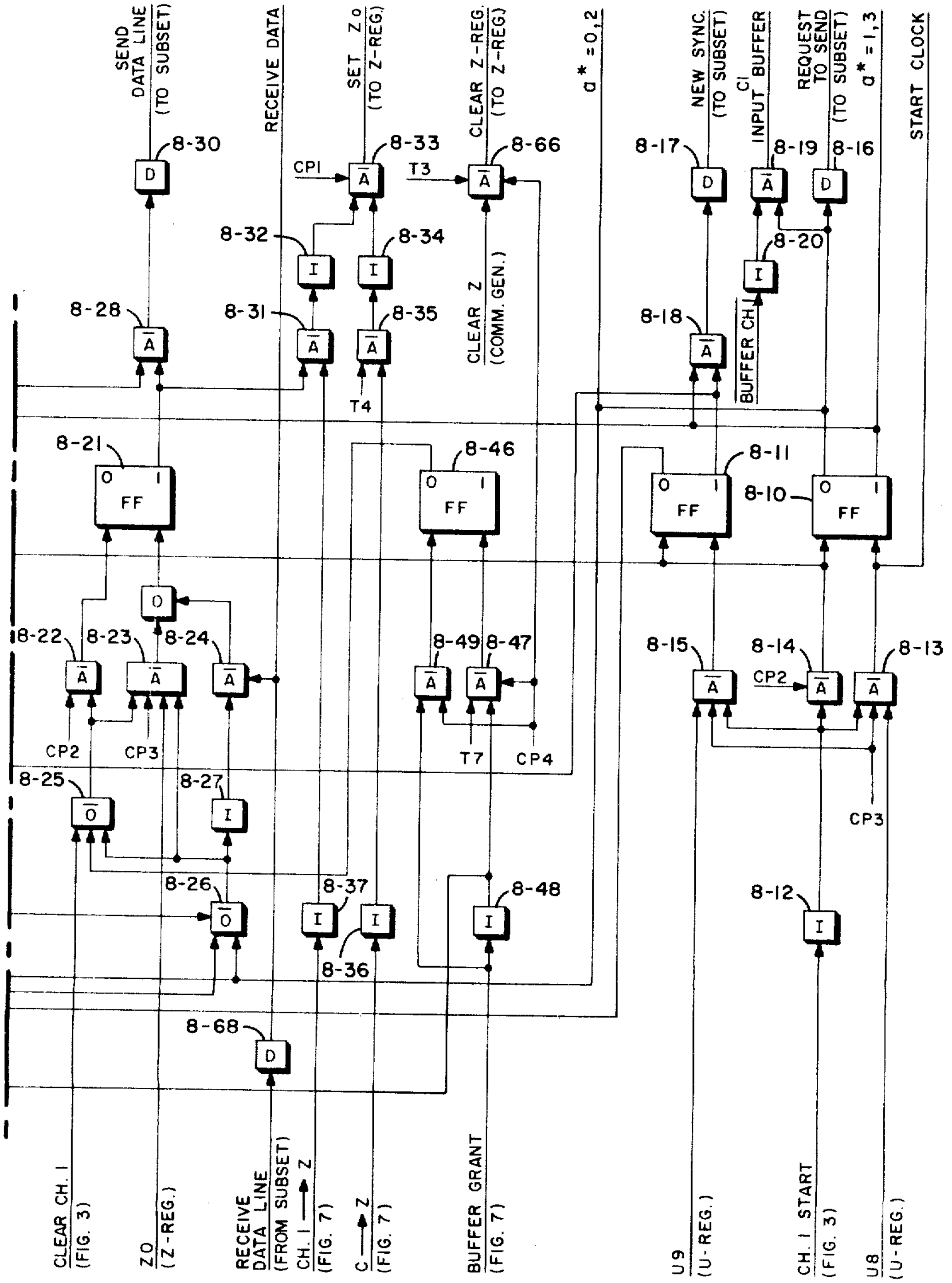
Figure 9:
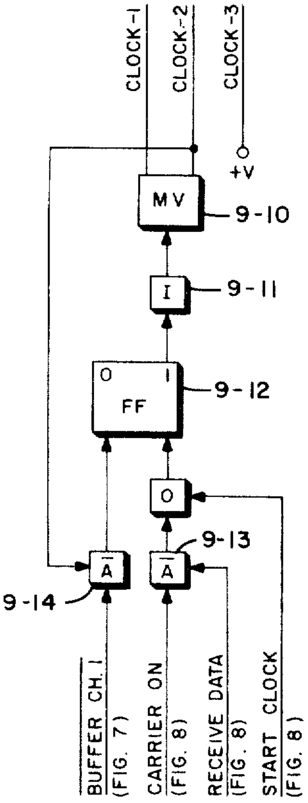
Figure 10:
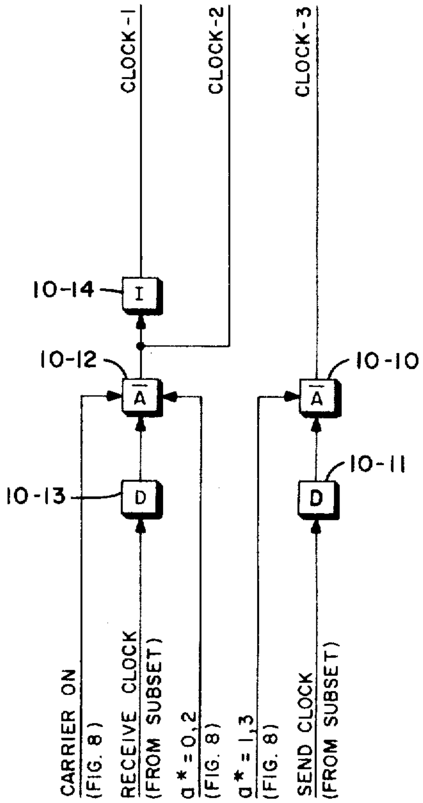
Figure 11:
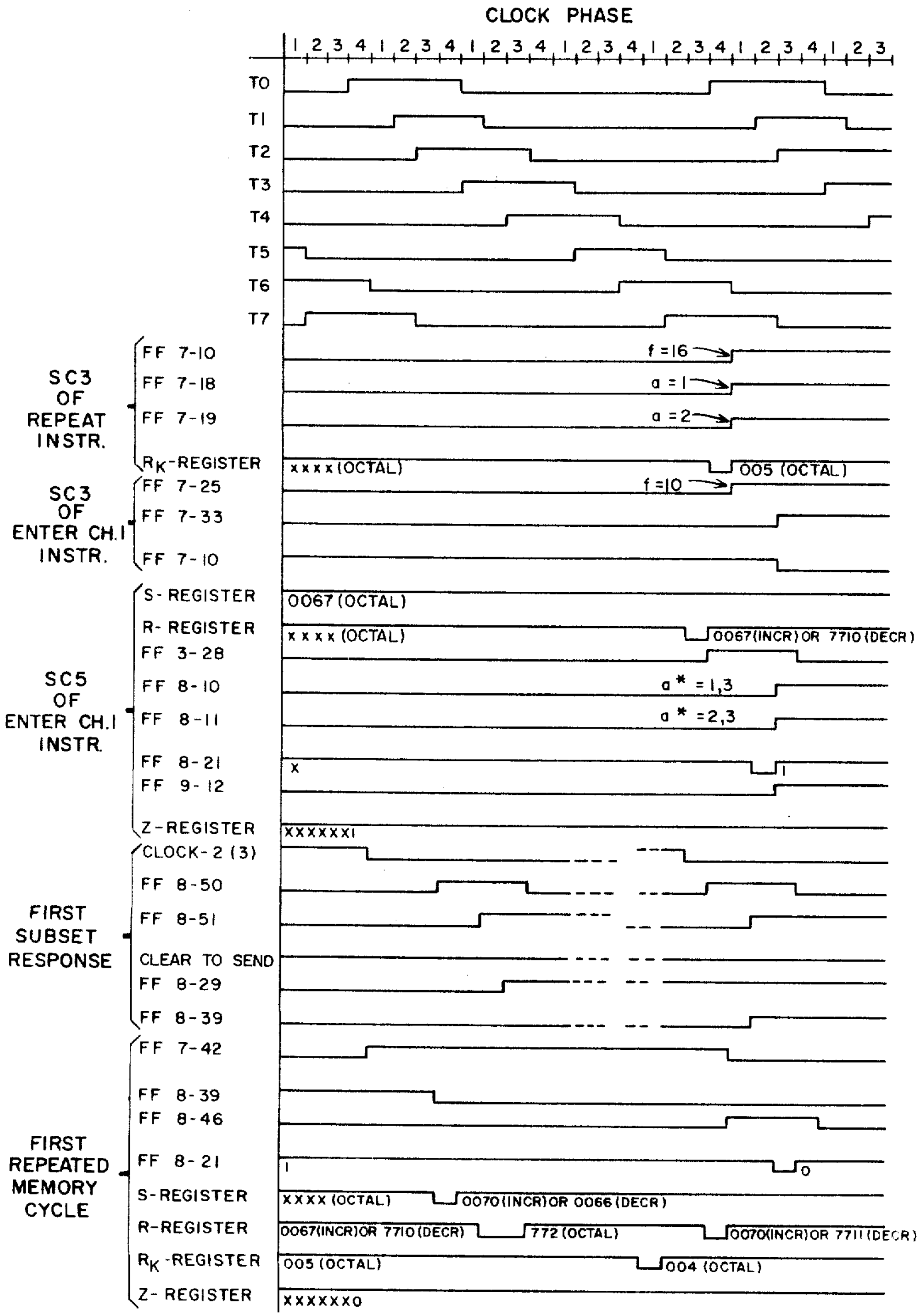
Figure 12:
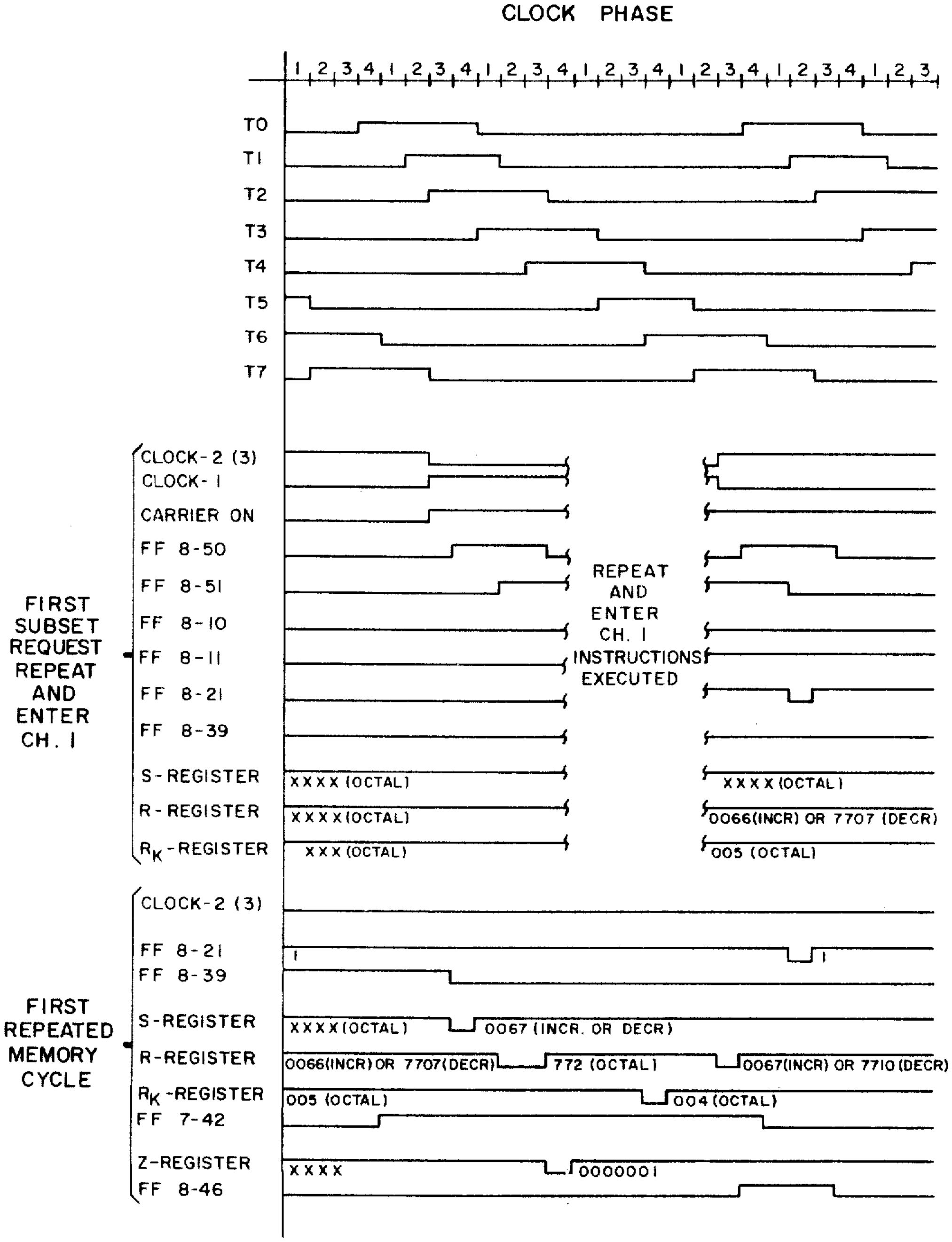

FIGURES 6*a* and 6*b* show details of the $R+1$ Adder;

FIGURES 7*a* and 7*b* show details of the repeat control circuits;

FIGURES 8*a* and 8*b* show details of the novel I/O Communications unit;

FIGURE 9 shows circuits required for non-synchronous operation;

FIGURE 10 shows circuits required for synchronous operation; and,

FIGURES 11 and 12 are timing diagrams illustrating the operation for both the Send and Receive modes of transmission.

In the figures, each component is identified by a hyphenated number, with the digit(s) to the left of the hyphen specifying the number of the figure in which the component is found. Input signals to a figure are, for the most part, identified in abbreviated form followed by digit(s) specifying the figure in which it is generated. In some cases, the unit of generation is given where no details of the unit are shown.

Figure 1:
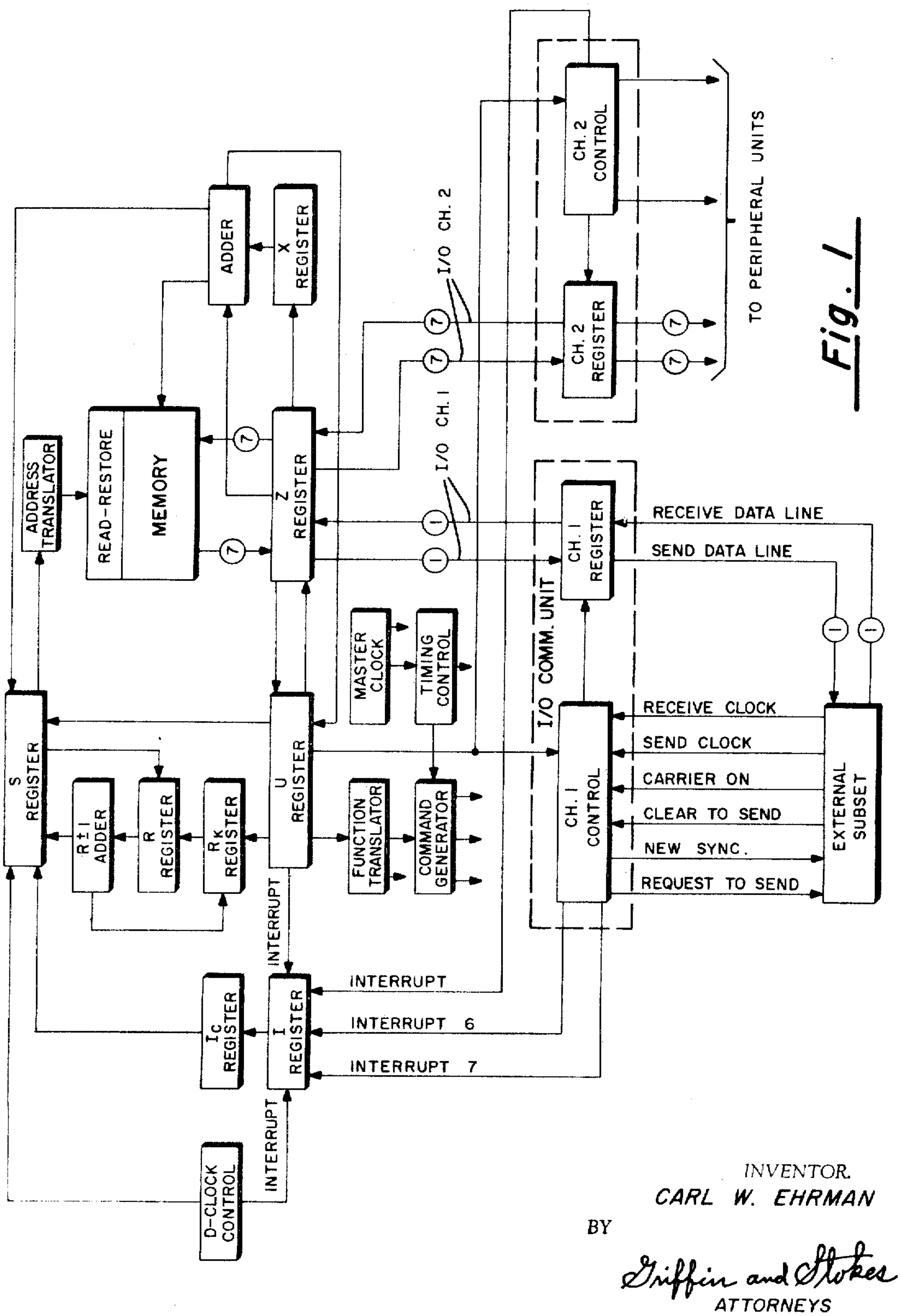
FIGURE 1 is an overall block diagram of a computer system which incorporates the present invention.

FIGURE 1 is an overall block diagram of a data processing system disclosed in the above identified Application A in which the present invention finds particular, although not exclusive, use. This system is a small, stored program digital computer some of whose applications in real time systems are as a communication switching center or as a process control data logger. The system has a random access, destructive readout, core storage memory containing four thousand ninety-six 7-bit word locations, each identified by a 12-bit (4 octal digits) address. Access to the memory for the purpose of either withdrawing or storing information is performed during a memoy cycle which includes Read followed by Restore portions in the well known fashion. An instruction is defined by 14 binary bits which are assembled by acquiring two 7-bit words in consecutive memory cycles from adjacent memory locations. The least significant seven bits of the instruction are found in a word held by an even numbered memory address location, whereas the most significant seven bits of the instruction are held in the next higher odd numbered memory address location. As an example, an instruction might be comprised of a seven bit word held in memory address 3126 (octal) and a seven-bit word in memory address 3127 (octal). The fourteen-bit instruction when assembled from memory contains a four-bit function code designator *f*, a two-bit accumulator register designator *a*, a two-bit extended address or index register designator *b*, and a six-bit operand designator *y*. These designators occupy the following bit positions of the instruction, with the bits in positions 0 through 6 being those found in the even numbered memory address location, and the bits in positions 7 through 13 being those found in the next higher odd numbered memory address location.

| 13 | 12 | 11 | 10 | 9 | 8 | 7 | 6 | 5 | 4 | 3 | 2 | 1 | 0 |
|---|---|---|---|---|---|---|---|---|---|---|---|---|---|
| f | | | | a | | b | | y | | | | | |

With the four-bit function designator *f*, the present system has a repertoire of sixteen basic functions. When extracting an operand from memory for use in executing an instruction, the lower order six bits of the operand address are supplied by the content of any one of four index registers specified in part by the two-bit *b* designator of the instruction. These index registers are hereafter termed the B registers. The seven-bit operand from the memory location identified by this assembled twelve-bit address may be arithmetically combined with a seven-bit value contained in any one of four memory locations identified in part by the two-bit *a* designator of the instruction. These registers identified by the *a* designator are hereafter called the A registers or accumulator registers. In the present system, the A and B registers are particular locations in the core memory. For input and output instructions the *a* designator is used to instead define certain input/output (I/O) operations such as the direction of information transferred between an external unit and memory. On the other hand, some non-I/O functions do not require the use of a value in the A register, in which case the *a* designator can be used to further define the function and effectively extend the number of function bits *f* to 6.

FIGURE 1 also shows the following registers which are comprised of flip-flop stages external to the core memory. The S register holds a 12-bit address for referencing memory. The Z register is a 7-bit memnry portal through which all information acquired from memory passes before being distributed either to the external unit or to other flip-flop registers. The Z register also holds the A register operand. The X register holds the 7-bit operand acquired from the memory location whose address consists in part of the *y* designator of the instruction. The adder is a logical matrix having inputs from both the Z and the X register and providing an output indicative of the sum of the two values held therein. Information may be written back into memory from either the Z register or from the output of the adder. The leftmost bit of the 7-bit operand is a sign bit which, if zero, designates a positive value. The arithmetic employed in the adder is 1's complement subtractive with end around borrow.

The U register is normally used to hold the 14-bit instruction currently being executed. It is also used as a transfer register during the acquisition of the address of the instruction. A function translator is provided which is responsive to the function designator *f* and decodes same so that the proper commands can be generated for executing the function. These commands are generated primarily in a command generator portion of the system according to the decoded function as well as to timing control signals. This timing control in turn is synchronized with a master clock which generates four clock phases designated as CP1, CP2, CP3, and CP4. These clock phases are cyclically generated in succession without overlap, and are also applied to other circuits of the system in the manner subsequently to be described in connection with the remaining figures.

The R register is comprised of twelve stages and is used for holding and modifying the operand address during a repeat sequence. It is also used for holding the next address when I/O buffer mode is active. Eight bits of this register are used for decrementing the repeat count during the repeats and buffers. The $R_K$ register is an 8-bit repeat count register whose content is decremented with each repeated instruction iteration or buffer character transfer, so as to indicate the number of iterations remaining to be performed or the number of characters that have to be transferred, respectively. The normal termination of a repeat or buffer function is determined by this register's content becoming equal to 0. If a repeat is terminated by the finding of a skip condition, the lower seven bits of this register are automatically stored in core memory address 0124 (octal). The $R+1$ Adder performs the incrementing or decrementing of the $R_K$ register and R register. These three units, the $R_K$ register, R register, and $R+1$ Adder provide some of the functions necessary in the present invention during the input/output operations, but are also used in internally executing certain other computer instructions which have nothing to do with external transfer of information. For the most part, means equivalent in broad function to these three units can already be found or easily incorporated into prior art systems.

As mentioned before, the four A registers and four B registers, any one of which may be designated by each instruction word, are found in the core memory at particular address locations which are set forth in details in the above identified Application A. Also in core memory is a program address (P) register comprised of two adjacent memory locations which hold the address of the current instruction being executed. Further included in core memory is a group of four 7-bit incremental clock registers Delta 0, Delta 1, Delta 2, and Delta 4 which are used for timing the program sequences. Each of these Delta registers, whose content is in the range of 001 to 100 (expressed in octal), is decremented by 1 approximately once each millisecond as controlled by an oscillator contained in the D-clock control. This range of sixty-four steps gives the ability to time events of up to approximately 62.5 milliseconds.

The particular system of FIGURE 1 also features an interrupt control which permits the selective execution of one of eight different programs stored in memory. Priority of execution exists between programs. The system provides an individual group of operational registers A and B, as well as a program address register 1, for each of these programs. This reduces the need for housekeeping instructions which otherwise would be required for every switch from one program to another. The interrupt status register, hereinafter referred to as the I register, is a 7-bit flip-flop register used for switching among the eight possible programs. The occurrence of any one of seven interrupt producing events (the lowest level priority does not produce an interrupt) sets a corresponding stage of the I register. At the start of any instruction cycle, the highest priority set stage of the I register causes a 3-bit IC register to be set to a value used to provide an address prefix for accessing a particular P register in memory. This P register contains the address of an instruction in the program having priority of execution in order that instructions belonging to that program may be acquired. During the actual execution of an instruction, the content of IC is also used in conjunction with the *a* and *b* instruction designators to address the A and B registers reserved for this program. This feature enables the control to be switched randomly among eight major program routines without danger of a routine losing step, and further prevents the contents of the operational registers of one routine from being affected by another. Furthermore, the I register may be changed at random times by new interrupt-producing events without changing the selection of a set of operational registers in the middle of an instruction cycle. The operational registers contained in the core storage thus include for each interrupt level: four 7-bit registers A0–A3, four 7-bit registers B0–B3, and a 14-bit program address register P comprised of two adjacent memory locations. It may therefore be seen that the particular A or B register selected during the execution of an instruction depends upon two factors, the first being the particular program of which the instruction is a part, and the second being the value of the *a* or *b* designator held by that instruction. Furthermore, each program has reserved to it a program address register P which sequentially supplies the addresses of the instructions to be executed in that program.

The I register further provides a priority determination when two or more interrupting events cause corresponding stages to be in a set condition at the same time. Consequently, only one program can control the computer at any one time, this normally being the one having the highest priority. The actual interrupting events used in setting stages of the I register may be either internal or external. For example, if the content of any one of the Delta registers in memory is decremented to zero (except Delta 0), then a particular stage in the I register is set. On the other hand, the termination of an input-output data transfer between the computer and an external unit will also set a stage in the I register and cause the computer to execute a different program in response to said termination. Parts of an instruction itself can be used to set I register stages. Other interrupt producing events may be pro-

| Function Code | Name | Description |
|---|---|---|
| 00 | Add | (A*a*) initial replaced by Sum of (A*a*) and (Y*b*). |
| 01 | Selective Complement | Bit positions of (A*a*) corresponding to 1's in (Y*b*) are complemented. |
| 02 (a+Ø) | Add 1, Compare | Increase (Y*b*) by 1, if result is more positive than A0, skip NI. |
| 02 (a=1) | Add 1 | Increase (Y*b*) by 1. |
| 02 (a=2) | Test Even Parity | Skip NI if (Y*b*) has even parity. |
| 03 | Compare | Skip NI if (A*a*)=(Y*b*). |
| 04 | Complement | Replace (A*a*) with complement of (Y*b*). |
| 05 | Logical Procudt | Replace (A0) with logical product of (A*a*) and (Y*b*). |
| 06 | Enter Accumulator | Replace (A*a*) with (Y*b*). |
| 07 | Index Skip | Skip NI if (A*a*)=(Y*b*); otherwise, add 1 to (A*a*). |
| 10 | Enter Channel 1 | Enter Channel 1 with (Y*b*) and Initate I/O function according to *a*. |
| 11 | Enter Channel 2 | Enter Channel 2 with (Y*b*) and initiate I/O function according to *a*. |
| 12 | Store Channel 1 | Store Channel 1 at Y*b* and test for skip according to Ch. 1 parity and *a*. |
| 13 | Store Channel 2 | Store Channel 2 at Y*b* and test for skip according to Ch. 2 parity and *a*. |
| 14 (a=Ø) | Enter I | Selectively set bits of I register corresponding to 1's of ($U_L$). |
| 14 (a=1) | do | Selectively clear bits of I register corresponding to 0's of ($U_L$). |
| 14 (a=2) | Enter B | Six bits of (Y*b*) to lower six bits of B*b*; 0 to high order bit of B*b*. |
| 14 (a=3) | do | Six bits of (Y*b*) to lower six bits of B*b*; 0 to high order bit of B*b*. |
| 15 | Store Accumulator | Store (A*a*) in Y*b*. |
| 16 (a≠3) | Repeat | If NI is repeatable, non-I/O instruction, repeat it "by" times. If NI is Enter Channel 1 or Enter Channel 2, establish Buffer transfer of "by" words. |
| 16 (a=3) | Buffer Active Jump | If buffer is completed as denoted by R*k*+0, jump to Y*b*. |
| 17 (a=Ø, b≠Ø) | | Jump unconditionally to Y*b*. |
| 17 (a=Ø, b=Ø) | | Jump unconditionally to Y*b*, then clear currently used bit of I register. |
| 17 (a≠Ø) | | If (A*a*)K(A0), jump to Y*b*. |

grammed or provided according to the particular environment in which the system finds itself.

The preceding table gives the basic instructions of the program repertoire. The four-bit function code *f* is given in octal notation, with bits 10–12 comprising the lower order. Other symbol notations used are the following:

()=The "content" of the register or address within the parenthesis.
A*a*=The accumulator register specified by the designator *a* and the controlling interrupt level.
B*b*=The extended address register specified by the designator *b* and the controlling interrupt level.
Y*b*=The twelve-bit operand address whose lower six bits are the *y* designator and whose upper six bits are the content bits 0–5 of the B*b* register.
NI=Next Instruction.
UL=The lower order seven bits of the U register.

The acquisition and execution of each instruction during an instruction cycle requires successive memory cycles whose number depends upon the particular function code and, at times, upon the valve of the *a* or *b* designator. In order to cycle the acquisition and execution of an instruction correctly, the timing control unit in FIGURE 1 includes an instruction sequence counter whose details are shown in FIGURE 9 of the above identified Application A. This counter is comprised of three flip-flop stages connected together to count in the well known Gray code so as to sequentially generate eight non-overlapping memory cycle signals SC0 through SC7, each on an individual output conductor. The following table shows the memory cycles required for each instruction.

| Memory Cycle | Instruction Function Code | Cycle Function |
|---|---|---|
| SC0 | 00 through 17 | Acquisition of $P_L$ (Instruction Address). |
| SC1 | do | Acquisition of $P_u$. |
| SC2 | do | $b_0y \longrightarrow U_L$, (7 bits). |
| SC3 | do | $fab_1 \longrightarrow U_u$, (7 bits). |
| SC4 | 00 through 13 | Acquisition of $B_b$. |
| SC4 | 14 (f=2 or 3) | Modify $B_b$. |
| SC4 | 15, 17 (a≠0) | Acquisition of $A_a$. |
| SC5 | 00 through 11 | Acquisition of $Y_b$. |
| SC5 | 12, 13 | Store $C_a$ at $Y_b$. |
| SC5 | 15 | Acquisition of $B_b$. |
| SC5 | 17 (a≠0) | Acquisition of $A_o$. |
| SC6 | 00, 01; 03 through 07 | Acquisition, alteration and restoral of $A_a$. |
| SC6 | 02 (f=o) | Acquisition of $A_o$. |
| SC6 | 15 | Form $Y_b$, Store A. |
| SC7 | 05 | Logical Product $\longrightarrow A_o$. |
| SC7 | 07 | Alteration and restoral of $A_a$. |

Each of the memory cycles SCO–SC7, as defined by the instruction sequence counter, is further broken down into operation times by providing a timing chain in the timing control unit whose details are shown in FIGURE 10 of the above identified Application A. This timing chain is comprised of eight flip-flops and, for each SC memory cycle, runs through a complete cycle itself to sequentially generate eight overlapping timing signals T0 through T7 each appearing on an individual output conductor.

The system also includes two input-output channels 1 and 2 which, in the above identified application A, were described as being identical in so far as each comprised plural conductors for transferring in parallel a 7-bit word in either direction between the Z register and an external peripheral unit. The two I/O channels operate independently of each other, however, and input and output on the same channel cannot be simultaneous. The present invention particularly concerns the modification of at least one of the input-output channels (preferably channel 1) such that plural data bits can only be transferred serially thereon instead of in parallel. To emphasize this distinction, FIGURE 1 shows circled numbers in the transfer lines between Z register and memory, and in the I/O Channel 1 and 2 transfer lines which are indicative of the number of bits transferred simultaneously during each input-output operation. This shows that 7 bits are transferred in parallel between the Z register and memory and also between Z register and a Channel 2 buffer register whose operation in both receiving and sending between external peripheral units is governed by a Channel 2 control circuit not part of the present invention. Only one bit of information is transferred between the Z register and a Channel 1 buffer register which in turn is comprised of but a single binary stage. Likewise, only one bit of information is transferred at a time between the Channel 1 buffer register and some external subset unit which is adapted only to process a serial pulse train rather than a parallel bit number. The operation of the Channel 1 input-output communications unit is governed by a Channel 1 control unit which issues and receives numerous signals with respect to the external subset and the internal computer system.

For timing in a synchronous system, one of a pair of timing square-wave Send Clock or Receive Clock signals is received from the data subset and allowed to enter I/O Comm. unit according to the operating mode. The frequency of these signals is equal to the bit transfer rate which can be handled by the subset. For a non-synchronous system timing, the square wave is supplied by an oscillator in I/O Comm. unit. Non-synchronous timing is provided by inserting two printed circuit cards in particular locations to feed the output of an oscillator into the timing control logic. The oscillator may be preset to accommodate various transmission rates. For operating into a synchronous system, a different pair of printed circuit cards in unique locations receive and pass on the signals from the data subset "Receive Clock" and "Send Clock" lines.

When sending, buffered data is requested from memory at the time of the leading edge of the first, or positive, half cycle of the timing square wave. When receiving, data is entered from the line into the Channel 1 Register at the time of the trailing edge of the timing wave positive half cycle (or beginning of its second half cycle) while a buffer request to store said received data into memory is made one-half cycle later by the next positive excursion of the timing wave. Since, in a typical synchronous system operating at 2000 serially transmitted bits per second, one bit time is ½ ms., each half-cycle of the timing square wave is 250 $\mu$s. Normally, an I/O buffer request is honored within 24 $\mu$s. or five memory cycles in the computer system, however, Jump and Buffer Active Jump instructions can lock out buffer requests for as long as 48 $\mu$s. In the worst case, 12 memory cycles or 57.6 $\mu$s. could occur from turn-on of a Buffer Request followed by a single Jump instruction followed by access of the next instruction and then through a Delta clock update before a Buffer Response occurs. Although this is quite safe for received data storage before loss of a bit, when sending it may approach an excessive delay before placing a new bit on the line. This problem can be corrected by providing a program which is running lockout-free, so that consecutive ("buffer") instructions can be executed. The above worst case is that of a Buffer Request appearing early in the access of a Conditional Jump found instruction (33.6 $\mu$s.) followed by an instruction access (19.2 $\mu$s.) with a Delta-clock update (4.8 $\mu$s.).

Upon start of received data, the first Space (high signal on Receive Data Line indicating a 0 value) bit which triggers a level 7 interrupt will enter the Channel 1 register 250 $\mu$s. after the interrupt; the second bit, either a Mark (a low signal on the Receive Data line indicating a 1 value) or Space (0) occurs at Level 7+750 $\mu$s. If the initial Space bit is to be included in the stored buffer, then the Repeat and Enter Channel 1 instructions must be executed within Level 7+250 $\mu$s. Reestablishment of buffers for continuing messages, following Level 6, is also required within a ¼ bit time.

Signals and/or connections employed for a Send mode, i.e., from memory to the data subset, are the following:

Request to Send: Emitted continuously when $$a^*=1 \text{ or } 3$$

used to command the subset to turn on the carrier for data transmission. This should be left turned on for at least one millisecond after the last Space Bit transmitted for certain specific subsets.

Clear To Send: Supplied by the subset following the Request To Send, as an indication that data transmission may begin. With its receipt, as controlled by timing logic, buffered data transmission will proceed automatically.

Send Data: Data signal line to the data subset. This line normally rests in a Mark (low) state, switching to Space (high) with a data bit 0 and $a^*$ (the $a$ designator of the Enter Channel 1 instruction)$=1$ or 3, after the leading edge of Clear To Send *and* the first Send Clock timing signal leading edge.

New Synch: A control signal to the data subset, provided whenever $a^*=3$. This may be used to inhibit reception of data signals from the subset any time when they may not be expected or desired.

Signals and/or connections employed for a Receive Mode, i.e. from the subset to memory, are the following.

Carrier On: An indication to the computer of the presence of an incoming message.

Receive Data: The data signal line from the data subset. This line also is normally in the Mark (low) state equivalent to a binary 1.

The operation of the I/O Comm. unit will now be briefly explained in the following paragraphs before moving to a detailed description of the circuits.

For a Send mode of transfer, a data character that is to be transferred from the computer to Channel 1 and thence to the subset must be first serialized such that its bits are placed in the same lowest order position of each of a plurality of adjacent address locations in the internal memory unit. This is done by internal programming techniques not part of the present invention. For example, consider the Table below which shows assumed values of binary bits residing in bit positions 0 through 6 of five adjacent memory addresses 0067 through 0073 (specified in octal).

| Memory Addresses (Octal) | | | | Memory Location Bit Positions | | | | | | |
|---|---|---|---|---|---|---|---|---|---|---|
| | | | | 0 | 1 | 2 | 3 | 4 | 5 | 6 |
| 0 | 0 | 6 | 7 | 1 | 0 | 0 | 0 | 0 | 0 | 0 |
| 0 | 0 | 7 | 0 | 0 | 0 | 0 | 0 | 0 | 0 | 0 |
| 0 | 0 | 7 | 1 | 1 | 0 | 0 | 0 | 0 | 0 | 0 |
| 0 | 0 | 7 | 2 | 1 | 0 | 0 | 0 | 0 | 0 | 0 |
| 0 | 0 | 7 | 3 | 0 | 0 | 0 | 0 | 0 | 0 | 0 |

The five bits of a single subset data word to be serially sent to said subset are found only in bit positions 0 of said five adjacent memory addresses. Thus, assuming that the lowest binary order bit of said subset data word is located in memory address 0067 and the highest order binary bit of the subset data word is located in memory address 0073, the subset data word sent from memory on Channel 1 in order of time will be 10110 starting with the bit from memory address location 0067.

The first step in the SEND operation is to execute a Repeat instruction (function code=16) having an $a$ designator equal to 1, and whose $b$ and $y$ designators are considered as one number having either a value equal to 005 (Octal) for one programming technique, or a value 004 (Octal) for a different programming technique. The $a=1$ designator value permits all repeated memory addresses starting with 0067 to be incremented by 1 for each data transfer from the computer to the subset. The $b\,y$ designator value is placed into the $R_K$ register where it will be decremented for each buffer operation in order to govern the length of the transfer, i.e. the number of bits sent to the subset. After said Repeat instruction has been executed, an Enter Channel 1 instruction is executed (function code=10) having its $a$ designator (referred to as $a^*$) equal to either 1 or 3, and with its $Yb$ value specifying memory address 0067. During the execution of this Enter Channel 1 instruction, the first specified 7-bit character from memory address 0067 is withdrawn and sent to the Z register. From here, only the bit in the 0 position of the Z register (Z register stage 0) is then sent to the Channel 1 single stage register in the I/O Comm. unit. The contents of the higher order bit positions 1–6 of a memory address location are of no importance and cannot be transferred to the data subset because of only the single bit storage provided in the I/O Comm. unit. Also, upon execution of the Enter Channel 1 instruction the two bits of $a^*$ are stored in the I/O Comm. unit. With $a^*=$ to 1 or 3, a Request To Send signal to the data subset is immediately turned ON and in the case of nonsynchronous operation, a timing control in the I/O Comm. unit begins generating a timing square wave of subset data bit frequency. Where synchronous operation is provided, however, the I/O Comm. unit is permitted to receive the Send Clock timing square wave signal from the data subset. The data subset will, after an indeterminate interval, respond to this Request To Send signal with a Clear To Send signal back to the I/O Comm. unit. With the next leading positive going edge of the timing square wave signal, whether internally generated (nonsynchronous) or received from the data subset as Send Clock (synchronous), the bit now in the Channel 1 register appears on the Send Data line where it is accepted by the subset. After such acceptance, the I/O Comm. unit requests the computer to reference its memory unit at address location 0070 in order to withdraw a second 7-bit data word therefrom and place same in the Z register. From the Z register, only the 0 position bit value (shown to be binary 0 in Table 1) is transferred to the Channel 1 register, from whence it will be subsequently accepted by the subset at the next leading positive going edge of the timing signal. Thus, with each successive timing square wave signal leading edge, the data bit in the Channel 1 register is accepted by the subset, and then is immediately replaced by the $2^0$ bit of the next adjacent memory address which follows in the sequence 0071, 0072, and 0073.

For each data bit transfer to the subset, except the first which is performed during the execution of the Enter Channel 1 instruction, the value in the $R_K$ register is decremented by 1. If the $R_K$ register is initially loaded with a number equal to the number of data transfers required, i.e. 5 in the case of the Table, then a sixth 7-bit data word from memory is withdrawn and placed into the Z register before the $R_K$ value goes to 0. However, although the bit from the 0 position of said sixth data word finds its way to the Channel 1 register, it will not be transferred to the subset since the I/O Comm. unit is disabled prior to the time when the subset could possibly accept such a sixth bit. On the other hand, in a different programming technique the number initially placed into the $R_K$ register (by the $b\ y$ designator bits of the Repeat instruction) is one less than the actual number of transfers required, i.e. 004 in the case of the above Table. For this second programming technique, a repeat count in register $R_K$ becomes equal to 0 concurrently with the sending of the fifth and last data bit to the Channel 1 register, and the I/O Comm. unit is not disabled until after the subset has had a chance to accept said fifth bit. For either programming technique, an interrupt level 6 interrupt occurs whenever the $R_K$ register goes to 0. Since the Request To Send signal is maintained as long as the I/O Comm. unit holds $a^*$, at some time (no sooner than one bit time after the last data bit has been accepted by the subset) a housekeeping Enter Channel 1 instruction from the level 6 program, with $a$ designator equal to 0, must be executed to clear the I/O Comm. unit of said $a^*$ and thus terminate the I/O operation. The control signal New Sync from the I/O Comm. unit to the subset is also provided whenever the $a^*=3$.

For the Receive mode of operation, whereby serialized data bits are sent from the subset to the computer, the arrival of a Carrier ON signal from the subset, in the absence of any current I/O Comm. unit operation, will enable the receipt by said unit of a Receive Clock timing square wave from the subset in the case of synchronous operation, or will alternatively turn on the internal bit rate clock of the I/O Comm. unit where non-synchronous operation is provided. With the first leading positive going edge of the timing signal, a level 7 interrupt occurs to thereafter establish an input operation to the computer in the following manner. A Repeat instruction (function code=16) is first executed whose *b y* designator values are placed into the $R_K$ register and, for a Receive mode, are always equal to the actual number of data transfers required from the subset to the computer. In the case of the Table above, where the data bits sequentially transmitted to the computer are to be placed in bit position 0 of adjacent memory addresses beginning with 0067, the *a* designator of said Repeat instruction is equal to 1. The next instruction from the level 7 program is an Enter Channel 1 (function code=10) having an *a* designator ($a^*$) equal to 2 and whose Y*b* value specifies a memory address of 0067. The execution of said Enter Channel 1 sets up appropriate circuits in the I/O Comm. unit and withdraws a 7-bit data word from memory address 0067 which is placed into the Z register. However, the bit in the 0 position of the Z register is not allowed to be transmitted to the subset for a Receive mode of operation. Following the execution of said Enter Channel 1 instruction, each data bit from the subset serially arrives on the Receive Data line at the Channel 1 register, with said bit being gated from the Receive Data line into said register at the midpoint of the timing square wave signal (i.e. by the leading negative going edge), and is thereafter presented to the computer memory via Z register at next following leading positive going edge of said timing signal. A program level 6 interrupt finally occurs, and terminates the buffer operation when $R_K$ goes to 0. A housekeeping Enter Channel 1 instruction is acquired therefrom with *a* designator of 0, and is executed to clear the I/O Comm. unit. This level 6 interrupt also occurs if the Carrier On signal is removed at any time during a Receive operation so as to permit early detection of a condition in which line noise causes spurious emissions of the Carrier On signal and one or more data bit signals.

In summary, the functions and signals of the I/O Comm. unit are as follows:

*Enter Channel 1 instruction (f=10)*

$a^*=0$ Normal Static condition, in which no I/O Comm. signals are being emitted, and from which a level 7 interrupt may occur if data begins arriving from the data subset.

$a^*=1$ Results in emission of "Request To Send." If operation is with a synchronous system, "Send Clock" is gated to the timing logic.

$a^*=2$ In conjunction with an Enter Channel 1 instruction, commands the storing in memory of the Channel 1 register with each buffer operation. Generates a level 6 interrupt if no Carrier On signal is present.

$a^*=3$ Identical to $a^*=1$, plus the continuous emission of the New Sync signal, which during its presence prevents the local data subset receiver from responding to line signals.

*Interrupts*

Level 6. This interrupt occurs when either an input or an output buffer terminates on Channel 1, as denoted by Repeat Count=0. Thus, it can occur immediately after the last buffer data acquisition or storage. This interrupt also occurs if an input buffer is active (buffer active, $a^*=2$) and Carrier On signal is absent, as would be the case after receipt of a few spurious, noise-caused bits.

Level 7. This interrupt only occurs when the I/O Comm. on Channel 1 has $a^*=0$ and the Carrier On signal appears together with a Space signal on the Receive Data line, denoting the start of a transmission.

FIGURE 2 shows the various symbols used for the logical components in the succeeding figures. The basic logical building block is that shown in FIGURE 2A which is comprised of a PNP transistor 2–10 having base input and collector output. This circuit can have one or more input terminals, with three being illustrated in FIGURE 2A. If any one of the input diodes 2–11 through 2–13 is rendered conducting by means of a relatively low signal applied to its input terminal, the current flow through resistors 2–14 and 2–15 makes the base of transistor 2–10 lower in potential than its emitter. This thereupon causes collector current flow through resistor 2–16 so as to produce a relatively high signal at output terminal 2–17. The diode 2–09 serves to clamp the output at a predetermined threshold in the absence of an input signal. However, if each of the input diodes is biased to a non-conducting condition by means of a relatively high signal applied to its respective input terminal, the transistor base becomes higher than its emitter and thus cuts off collector flow. This results in a relatively low potential appearing at the output terminal 2–17. Consequently, the basic circuit in FIGURE 2A acts as an AND-Inverting circuit in that it produces a relatively low output signal when all of its inputs are high. When used in this respect, the circuit detects the concurrent application of high signals to all of its inputs and is given the symbol shown in FIGURE 2B. On the other hand, the basic circuit in FIGURE 2A produces a relatively high output signal when any one or all of its input signals is low. Thus, it provides an OR function with respect to detecting relatively low input signals. When the basic circuit is used in this manner, the symbol is as shown in FIGURE 2C. If only one input terminal is provided to the circuit, it acts merely to invert the input signal with this function being represented by the legend in FIGURE 2D. In the succeeding drawings, input leads may actually be shown applied to two or more sides of the block enclosing the logical symbol.

A diode OR gate is also used in some of the figures to buffer together the outputs from several $\overline{A}$ gates. This gate has the block legend 2–21 and circuit configuration as shown in FIGURE 2E. Two or more input diodes 2–22 and 2–23 have anodes connected to junction 2–24. A resistor 2–25 is connected between junction 2–24 and a source of +V. The potential at junction 2–24 follows the potential of the lowest signal applied to the input diodes so that the circuit acts to generate a low output for any low input.

Two $\overline{O}$ gates 2–26 and 2–27 cross-coupled in the fashion shown in FIGURE 2F provide a bistable flip-flop stage. Such a combination may be switched from one state to the other by the application of a low signal to an input. For example, initially assume that the combination of FIGURE 2F is in a state such that the output of $\overline{O}$2–26 is high and the output of $\overline{O}$2–27 is low. The signals applied to all input terminals 2–28 through 2–31 are high. The low output of $\overline{O}$2–27, when applied to one input of $\overline{O}$2–26, maintains the latter's output high. The high output from $\overline{O}$2–26, when coupled with the high inputs on terminals 2–30 and 2–31 maintain the output of $\overline{O}$2–27 at its low value. This potential state of the circuit is therefore stable and can be altered only by applying a low signal to either one or both of the input terminals 2–30 or 2–31 of $\overline{O}$2–27. When this occurs, the output of $\overline{O}$2–27 becomes high. The high output of $\overline{O}$2–27 is applied to one input of $\overline{O}$2–26 whose other inputs are still high at this time. Consequently, the output $\overline{O}$2–26 goes low to thereby keep $\overline{O}$2–27 high. The signal on input 2–30 can now become high without destroying the high output from $\overline{O}$2–27, since this gate still receives a low input from the output of $\bar{O}$2–26. In order to once again generate a high output from $\bar{O}$2–26, a low input must be applied to either one of the inputs 2–28 or 2–29.

Instead of showing each flip-flop stage as a combination of two $\bar{O}$ gates, the succeeding drawings use the symbol of FIGURE 2G. In order to define the two different bistable states, a 0 and a 1 value may be assigned to the outputs, such that a flip-flop may either be in a 0 condition (clear) or a 1 condition (set) depending upon the output terminal generating the high signal.

Figure 3:
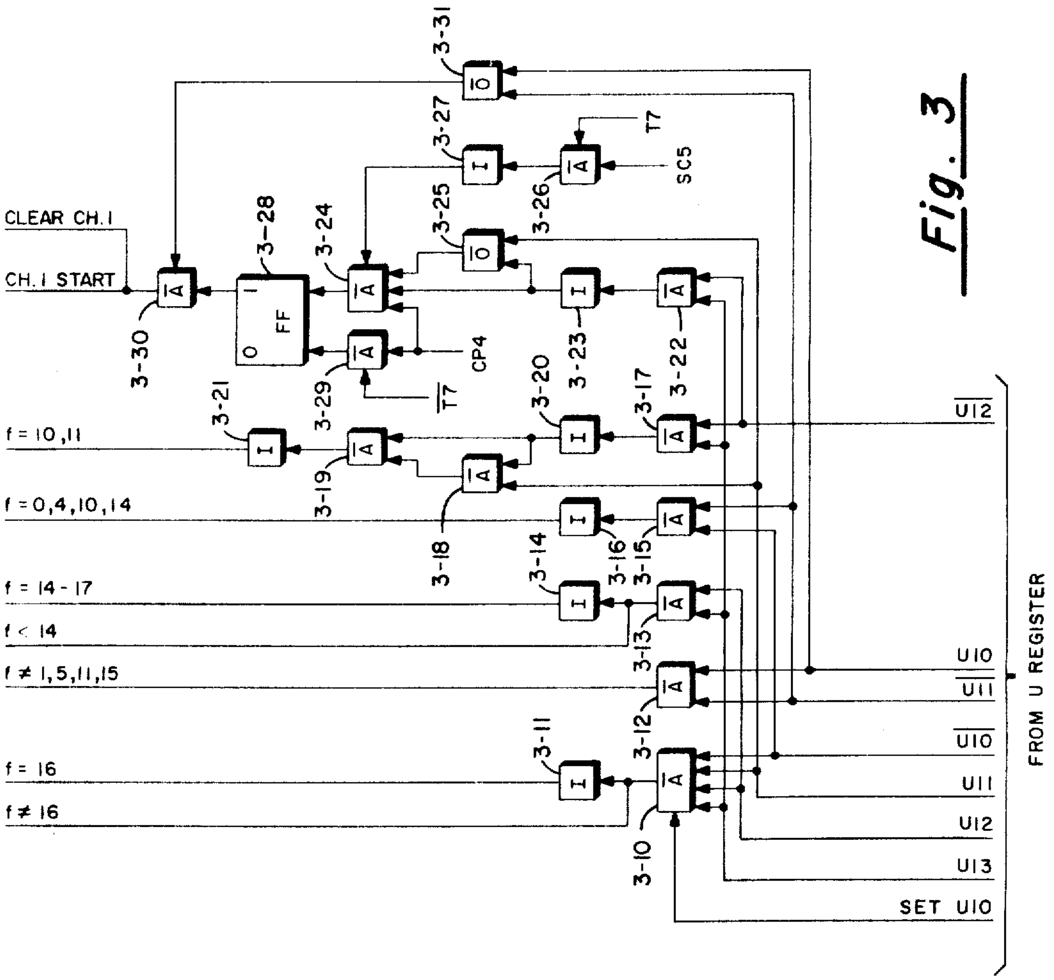
FIGURE 3 shows certain details of the function code translator circuits.

FIGURE 3 shows but a small portion of the function code translator used in detecting instruction words whose function codes are 10 (Enter Channel 1) and 16 (Repeat). Other portions of the function code translator are disclosed and described in the above-identified application A, but said additional portions concern instruction words the detailed operation of which is not necessary to the understanding of the present invention. In FIGURE 3, $\bar{A}$ gate 3–10 is enabled to produce a low output if the instruction word contained in the U register has a function code of 16 (octal). The lower order octal digit 6 of said function code is indicated by a binary 0 value in stage 10 of the U register, thus providing a high signal $\overline{\mathbf{U10}}$, and binary 1's in stages 11 and 12 of the U register such that the high signals U11 and U12 are present. The higher order octal digit 1 in this function code is indicated by a binary 1 in stage 13 of the U register, thereby producing the U13 signal which is high. The Set U10 input signal to $\bar{A}$3–10 is normally high unless a binary 1 value is currently being entered into stage 10 of the U register, in which case the function code 16 would not be present. This signal Set U10 is shown generated in FIGURE 6 of the above-identified application A but is merely used because of the close timing in the particular system being described. A low output from $\bar{A}$3–10 is inverted by I13–11 to produce a positive signal $f=16$ indicative of a function code of 16. On the other hand, if function code 16 is not present in the U register, the output of $\bar{A}$3–10 is itself high which is indicative of a function code not equal to 16: $f\neq 16$. For this latter condition, the output of I13–11 would be low.

$\bar{A}$3–12 is responsive to the high signals $\overline{\mathbf{U11}}$ and U10 for producing a low output indicative of the fact that the function code of the U register is any one of the following: 1, 5, 11, or 15. This must be the case, since stage 10 of the U register contains the lowest order bit of the right hand octal digit, while stage 11 contains the next lowest order bit of said right hand octal digit. If U stage 10 therefore contains a binary 1 value while stage 11 contains a binary 0 (this condition being indicated by high signals U10 and $\overline{\text{U11}}$) then the right hand octal digit must be either 1 or 5 depending upon whether or not a binary 0 or a binary 1 value is in stage 12 of the U register. Consequently, when the output of $\bar{A}$3–12 itself is high, this must indicate that the function code in the U register is other than said previously identified four codes.

$\bar{A}$3–13 produces a low output whenever the function code in the U register is any one of the following: 14, 15, 16, or 17. I3–14 inverts the low output of $\bar{A}$3–13 to provide a high signal $f=14$–17 indicating the presence of one of said function codes. On the other hand, when $\bar{A}$3–13 is high, this must indicate a function code of less than octal value 14, i.e., $f<14$. $\bar{A}$3–13 performs this translation because there must be binary 1 values in both stages 13 and 12 of the U register before the output of $\bar{A}$3–13 becomes low. This therefore requires that the left hand octal digit of the function code be 1, while the right hand digit be equal to at least 4.

$\bar{A}$3–15 responds to any one of the function codes 0, 4, 10, and 14 in order to produce a low output which, when inverted by I3–16, generates a high signal $f=0$, 4, 10, 14 indicative of this fact. This is so, since $\bar{A}$3–15 goes low only when signals $\overline{\text{U10}}$ and $\overline{\text{U11}}$, are present, indicating binary values in both stages 10 and 11 of the U register. Since, therefore, the two lowest order bits of the right hand octal digit are both zero, said right hand octal digit must be either 0 or 4.

$\bar{A}$ gates 3–17, 3–18, and 3–19, together with I gates 3–20 and 3–21, provide a combination which produces a high signal $f=10$, 11 indicative of a function code of either 10 or 11. $\bar{A}$3–17 by itself becomes low if a binary 1 is in stage 13 and a binary 0 is in stage 12 of the U register, indicative of function codes 10, 11, 12, or 13. Consequently, the inversion of this low signal by I3–20 causes one input to $\bar{A}$3–19 to go high. $\bar{A}$3–18 also receives an output from I3–20 as well as a signal from stage 11 of the U register. If a binary 0 is stored in stage 11, signal U11 is not present, thus making the output of $\bar{A}$3–18 high which in turn causes a low output from $\bar{A}$3–19 and a high output from I3–21. A binary 0 value in stage 11 of the U register indicates that the right hand octal digit of the function code must be any one of the following: 0, 1, 4, or 5. However, the high output from I3–20 is also indicative of the fact that stage 12 in the U register has a 0 value therein which thereby eliminates said right hand values of 4 and 5. Consequently, the output from $\bar{A}$3–19 when low can only occur if the function code is either 10 or 11.

FIGURE 3 further shows means for generating two command signals Channel 1 Start and Clear Channel 1 in response to a function code 10 in the U register. $\bar{A}$3–22 goes low if a binary 1 is in U register stage 13 and a binary 0 is in U register stage 12. When inverted by I3–23, one input to $\bar{A}$3–24 is present. This single input by itself indicates that the function code in the U register is any one of the following: 10, 11, 12 or 13. If a binary 0 is in U register stage 11, then one input to $\bar{O}$3–25 is low, making its output high. Thus, said high outputs from I3–23 and $\bar{O}$3–25 indicate that the function code is either 10 or 11. During time T7 of the memory cycle SC5, the appearance of clock CP4 will then enable $\bar{A}$3–24 to produce a low output setting flip-flop 3–28 so that its 1 output terminal goes high. FF3–28 is subsequently cleared by $\bar{A}$3–29 at the first CP4 occuring following the end of time T7, since the high signal $\overline{\mathbf{T7}}$ is present except during time T7. When the 1 output of FF3–28 goes high, $\bar{A}$3–30 becomes enabled only if $\bar{O}$3–31 also produces a high output. For a function code of 10, this will be the case because a binary 0 value is stored in stage 10 of the U register, thus making at least one input to $\bar{O}$3–31 low. However, if the function code is 11, then both signals $\overline{\text{U10}}$ and $\overline{\text{U11}}$ are present which make the output of $\bar{O}$3–31 low and prevents the enabling of $\bar{A}$3–30. Thus, it is apparent that a low output from $\bar{A}$3–30 indicates that a function code of 10 has been detected in the U register during the indicated memory cycle times.

Figure 4:
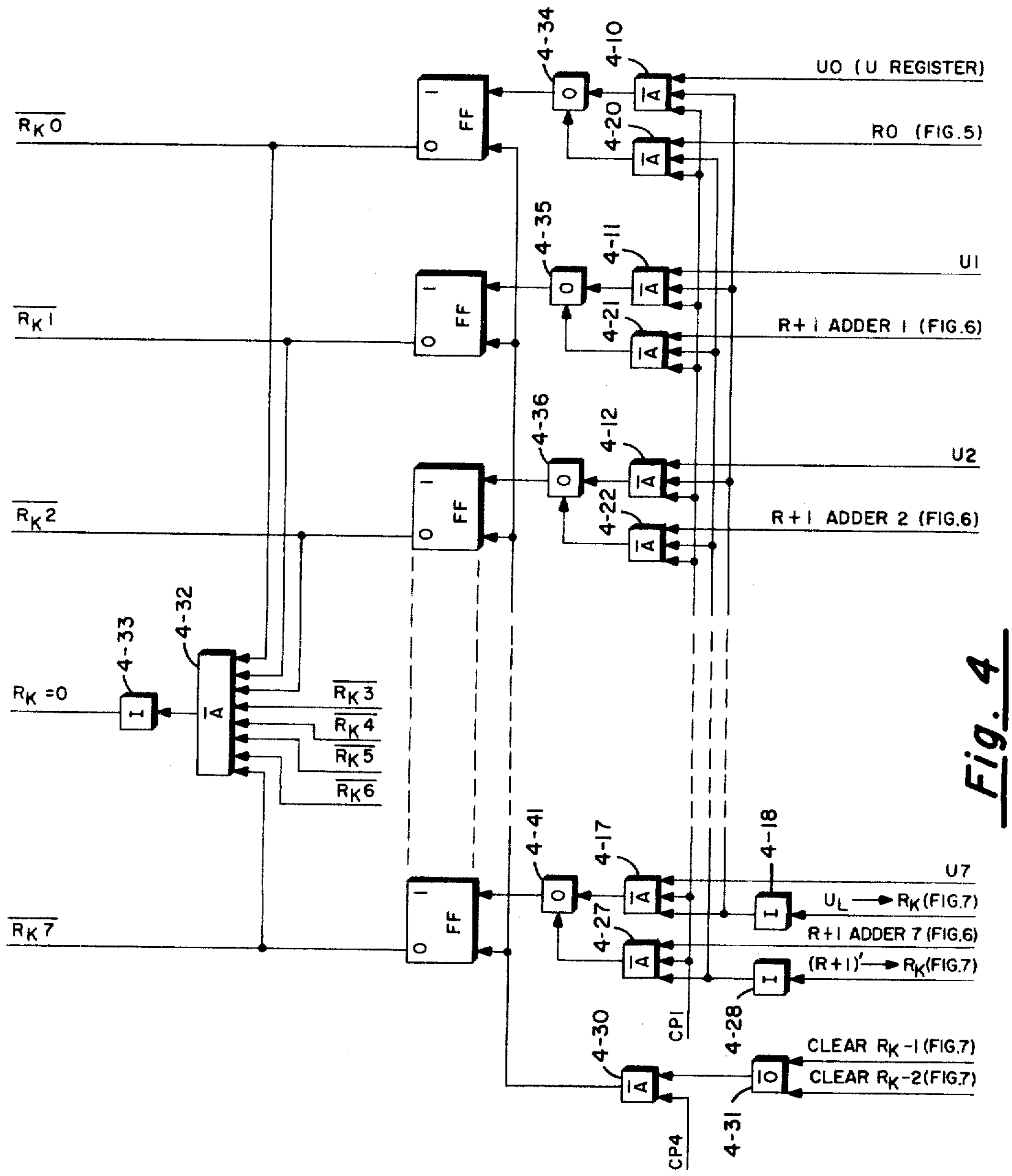
FIGURE 4 shows certain details of the $R_K$ register.

FIGURE 4 shows details of the $R_K$ register employed to hold an eight bit number which indicates the number of data transfer cycles remaining to be made in a buffered input-output operation. For the sake of drawing simplicity, only 4 flip-flops of this register are shown, with stages 3, 4, 5, and 6 not being drawn in detail. The $R_K$ register is loaded from either one of two different sources. When a Repeat instruction (function code of 16) is entered into the U register, the $R_K$ register is set to the 8-bit value which has its two most significant bits equal to the 2-bit $b$ designator, and its 6 least significant bits equal to the 6-bit $y$ designator. This entry is performed via a set of $\bar{A}$ gates 4–10 through 4–17 which are supplied with signals U0, U1, U2, etc. from the 1 output terminals of U register stages 0 through 7 which hold said 8-bit value. $\bar{A}$ gates 4–10 through 4–17 are enabled to pass this information whenever a CP1 arrives in the presence of a low command signal $U_L$ To $R_K$ applied to these gates via I4–18. The other source of input to the $R_K$ register is derived from the $R+1$ Adder circuit of FIGURE 6, with the exception that stage 0 of the $R_K$ register instead receives an input from stage 0 of the R register of FIGURE 5. This transfer is made via a second set of $\bar{A}$ gates 4–20 to 4–27 which are enabled to pass said information when a CP1 arrives during the presence of a low command $(R+1)' \rightarrow R_K$ as applied via I4–28. Means are further provided to clear each $R_K$ stage prior to entry of information thereto. This is performed by enabling $\bar{A}$4–30 at CP4 time in the event that the output from $\bar{O}$4–31 is high, which is the case if either of the inputs Clear $R_K$–2 or Clear $R_K$–1 goes low.

The input-output buffer operation generally terminates when the number in the $R_K$ register eventually becomes equal to 0. This is detected by $\bar{A}$4–32 which derives seven inputs from the 0 output terminals of all $R_K$ register flip-flops. Thus, it is only when a binary 0 value resides in each said $R_K$ flip-flop that all inputs to $\bar{A}$4–32 become high so as to make its output low. This low output in turn is inverted by I4–33 to produce a high signal $R_K=0$ used elsewhere as will subsequently be described.

Figure 5:
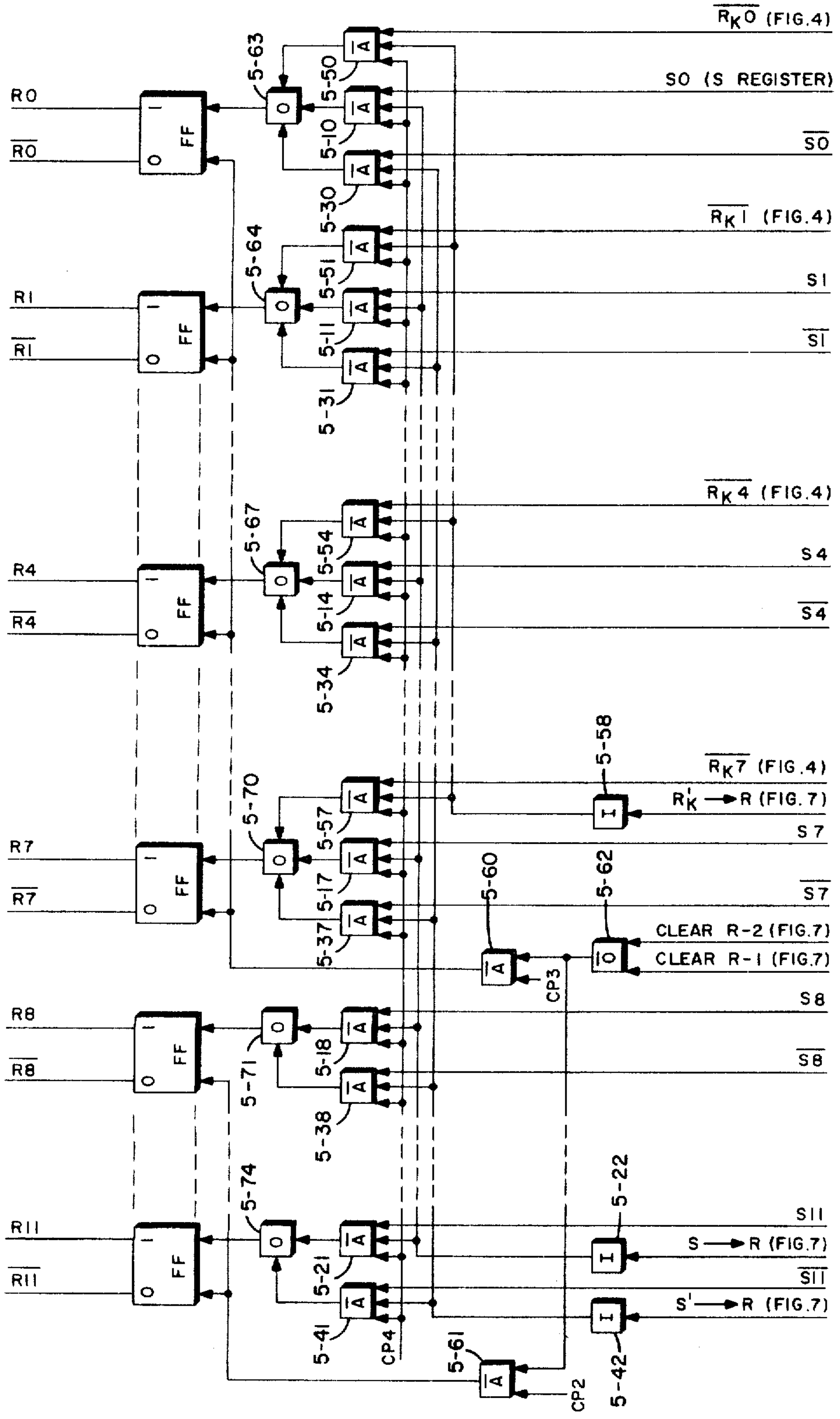
FIGURE 5 shows details of the R register.

FIGURE 5 shows details of the R register whose primary function is to store a 12-bit address used in referencing memory for a storage location therein which either receives information from the external subset unit, or transmits information to the external unit. This address may remain the same for each transfer of data during the buffer operation, or may be incremented or decremented by 1 each time a transfer is made so as to select sequential memory locations. The R register further serves as a temporary buffer storage for the $R_K$ register number on its way to the $R+1$ Adder. Entry of information into the R register may therefore be made from either one of two sources. The S register, which must be filled with a memory address before the address translator circuits of the memory can operate, transfers either the true value or 1's complement value of its contents into the R register according to whether the sequential buffer addresses are respectively incremented or decremented by 1 for each data transfer. True bit values from the S register are gated into R register via a set of $\bar{A}$ gates 5–10 through 5–21 at CP4 during the presence of a low signal S To R applied via I5–22. Complement values of the S register, as specified by the $\bar{S}$ outputs, are transferred into the R register via a second set of $\bar{A}$ gates 5–30 through 5–41 also during CP4 time whenever the low signal S′ To R is applied via I5–42.

The second source of information for the R register is derived from the 1's complement of values held in the $R_K$ register previously described in FIGURE 4. The purpose of this transfer is to use the R register as an intermediate buffer storage for the $R_K$ register values when the $R_K$ value is to be decremented by 1 for each data transfer to or from memory. The R register then applies this complement $R_K$ value to the $R+1$ Adder, next to be described, in order to provide the decrementing operation. However, since $R_K$ is only an 8-bit register, only stages 0 through 7 of the R register need be employed for this function. A third set of $\bar{A}$ gates 5–50 through 5–57 respectively gate said $R_K$ complement values at CP4 whenever the low signal $R_{K'}$ to R is applied via 15–58.

In addition to the gates described above $\bar{A}$5–60 is employed to clear the R register stages 0 through 7 at CP3 while $\bar{A}$5–61 clears stages 8 through 11 at CP2. Both of these $\bar{A}$ gates require a high output from $\bar{O}$5–62 which occurs when either of the two signals Clear $R-1$ or Clear $R-2$ is present.

FIGURE 6 shows details of the $R+1$ Adder employed both to modify memory addresses of the data words transferred in a buffered I/O operation as well as to decrement 1 by the content of the $R_K$ register each time that a data transfer is made. Consequently, outputs from the $R+1$ Adder are taken both to the 12-bit S register as well as to the 8-bit $R_K$ register. The input to the $R+1$ Adder, however, is derived only from the R register which in turn holds either the memory address used during the previous data transfer, or the contents of the $R_K$ register transferred thereto whenever decrementing of the $R_K$ count is required.

The general theory of operation of the $R+1$ Adder may be briefly summed up as follows. The true value of a number to be incremented by 1 is first transferred into the R register from whence it is then applied to the $R+1$ Adder. There, a 1 is added to its lowest order bit with a carry rippling to the highest order bit in order to produce true bit values of the sum. This true sum is then transferred from the $R+1$ Adder into the S register. The following two examples illustrate this incrementing process.

| | | | | | | | | | | | | |
|---|---|---|---|---|---|---|---|---|---|---|---|---|
| (1) Register (True Value) | 0 | 0 | 0 | 0 | 0 | 1 | 0 | 0 | 1 | 0 | 1 | 0 |
| | | | | | | | | | | | + | 1 |
| S Register (True Value) | 0 | 0 | 0 | 0 | 0 | 1 | 0 | 0 | 1 | 0 | 1 | 1 |
| (2) R Register (True Value) | 0 | 0 | 0 | 0 | 0 | 1 | 0 | 0 | 1 | 0 | 1 | 1 |
| | | | | | | | | | | | + | 1 |
| S Register (True Value) | 0 | 0 | 0 | 0 | 0 | 1 | 0 | 0 | 1 | 1 | 0 | 0 |

Where the true value of a number is to be decremented by 1, its 1's complement value is first transferred into the R register from whence said complement value is then applied to the $R+1$ Adder and 1 added thereto in the manner indicated in Examples 1 and 2 above. However, the row sum resulting from this addition is in turn complemented before being applied to either the S register or the $R_K$ register. Examples 3 and 4 below illustrate this decrementing operation.

| | | | | | | | | | | | | |
|---|---|---|---|---|---|---|---|---|---|---|---|---|
| (3) R Register (Complement Value) | 1 | 1 | 1 | 1 | 1 | 0 | 1 | 1 | 0 | 1 | 0 | 1 |
| | | | | | | | | | | | + | 1 |
| | 1 | 1 | 1 | 1 | 1 | 0 | 1 | 1 | 0 | 1 | 1 | 0 |
| S or $R_K$ Register (True Value) | 0 | 0 | 0 | 0 | 0 | 1 | 0 | 0 | 1 | 0 | 0 | 1 |
| (4) R Register (Complement Value) | 1 | 1 | 1 | 1 | 1 | 0 | 1 | 1 | 0 | 1 | 1 | 0 |
| | | | | | | | | | | | + | 1 |
| S or $R_K$ Register (True Value) | 0 | 0 | 0 | 0 | 0 | 1 | 0 | 0 | 1 | 0 | 0 | 0 |

Referring now to the details of FIGURE 6, each of a first set of $\bar{A}$ gates 6–11 through 6–21 receives as one input thereto a high signal $\overline{R1}$ through $\overline{R11}$, respectively, whenever the indicated stage of the R register contains a binary 0 value. Each of these $\bar{A}$ gates is able to respond to the value in its associated R register stage only when there is no carry from the next lower binary order into the binary order with which the $\bar{A}$ gate is associated. Thus, the purpose of each said $\bar{A}$ gate is to transfer, without complementing the value in its associated R register stage only when the addition process in lower order stages does not necessitate a change in the sum bit value of its order. On the other hand, each of a second set of $\bar{A}$ gates 6–22 6–32 operates to complement the value standing in its associated R register stage if required to do so by a carry over from the next lower order stage. $\bar{A}$6–22 has for example, two inputs R0 and R1 applied by the 1 output terminals of the 0 and 1 stages of the R register (the other input to Ā6–22 is a command signal Inhibit $R+1$ whose function will subsequently be described). Ā6–23 includes all of the signals applied to Ā6–22 plus an output from the 1 terminal of R register stage 2. Ā6–24 has the same inputs as are applied to Ā6–23, together with an output from the 1 terminal of R register stage 3. Since the command sigal Inhibit $R+1$ Add is high for either an incrementing or decrementing operation, it will be seen that the output condition of Ā6–22 is dependent upon the values held in the R0 and R1 stages. If each said stage contains a binary 1, thereby generating high signals R0 and R1, then Ā6–22 goes low, indicating both that the sum bit in the binary order $2^1$ should be changed to 0 and that a carry should be transferred to the binary order $2^2$. A connection is made between the output of Ā6–22 and an input to Ā6–22 so as to inhibit the latter, by making its output high regardless of the value in R register stage 2 in the event that a carry is applied to its binary order. Likewise, the output of each Ā gate in said second set 6–23 through 6–32 is connected to one input of that Ā gate in said first set 6–13 through 6–21 which is associated with the next higher binary order. Ā6–23 goes low only if binary 1 values reside in R register stages 0, 1, and 2, thus indicating that the sum bit in binary order $2^2$ should be value 0 and that a carry is transferred from binary order $2^2$ into binary order $2^3$.

In order to avoid increasing the number of input terminals to each successive one of Ā gates 6–25 through 6–32, the output of every third or fourth gate of this set is inverted and applied to input terminals of three or four of the gates in the same set which are associated with the next higher binary orders. Thus, the output from Ā6–24 is inverted by I6–33 and applied as an input to Ā gates 6–25 through 6–28. These four Ā gates additionally have an input from the 1 output terminals of their associated R register stage as well as having inputs from those next lower order R register stages which are not involved in determining the signal from Ā6–24. Thus, Ā6–26 also is supplied inputs by the 1 output terminal of R register stages 4 and 5, while Ā6–27 and Ā6–28 follow suit in similar manner. The output from Ā6–28 is inverted by I6–34 for application to Ā gates 6–29 through 6–32 in order to also avoid having to provide increasing numbers of input terminals to accommodate additional signals from R register stages 8 through 11.

As seen by Examples 1 and 2 above concerning the incrementing operation, the true value of the sum generated by the two sets of Ā gates just described will be transferred without further complementing into the associated S register stages. This function is performed by Ā gates 6–35 through 6–45 which receive the outputs from both of the two sets previously described, and whose output in turn is applied to another set of Ā gates 6–46 through 6–56. Although gates Ā6–35 through 6–45 are enabled by a high signal from I6–57 during either an incrementing or a decrementing operation, Ā gates 6–46 through 6–56 are enabled only when a transfer is to be made to the S register without further complementing for an incrementing operation. Ō6–58 thus produces a high output at this time. The outputs of Ā gates 6–46 through 6–56 in turn are applied to another set of Ā gates 6–59 through 6–69 for a direct application to the binary 1 input terminals of the associated S register flip-flops. For any said S register flip-flop, a negative or low signal must be applied to said binary 1 input terminal in order to set flip-flop to a binary 1 value. This last set of Ā gates is actually clocked at CP1 to provide synchronization with the rest of the system.

During a decrementing operation, the row sum bits obtained from the addition of 1 to the lowest order bit of a complemented value from the R register must in turn be complemented before entering same into the S register or into the $R_K$ register. This additional complementing step is performed by Ā gates 6–70 through 6–80 which are only enabled when a high output from Ō6–81 is applied thereto. Ā gates 6–70 through 6–10 likewise respond to inputs from Ā gates 6–11 through 6–21 and Āgates 6–22 through 6–32 in the same manner as do respond Ā gates 6–35 through 6–45. However, the outputs from Ā gates 6–70 through 6–80 are applied directly to S register Ā gates 6–59 through 6–69 without passing through the intermediate inverting gates Ā6–46 through 6–45. Furthermore, said gates 6–70 through 6–76 further provide inputs where indicated to the $R_K$ register in FIGURE 4.

What has so far been described is the formation of the sum bits in binary order stages $2^1$ through $2^{11}$. The sum bit in the lowest order binary position $2^0$ is for the S register, entered by Ā6–82. This gate, besides being responsive to CP1, also has inputs applied from I6–57, Ā6–83, and Ā6–85. For any incrementing operation Ā6–83 has at least one low signal $\overline{\text{Increment}}$ applied thereto so that it will always be high. Consequently, the output produced by Ā6–82 depends upon the output from Ā6–85 which in turn is enabled by the high signal Increment to sample the bit stored in R register stage 0. The operation here is thus to actually transfer the complement value of the R0 stage bit into S0 stage. When decrementing, however, the Increment signal is low and $\overline{\text{Increment}}$ is high, so that the value in R register stage 0 is transferred without change via Ā6–82 and Ā6–83 to stage 0 of the S register. This is also the case whenever the same memory address is to be used for all transfers to and from memory.

The overall operation of the $R+1$ Adder will now be described using the values in Examples 1 through 4 given above. Reference will also be made to FIGURES 4 and 5 respectively showing the $R_K$ register and the R register. Assume that the S register is holding a 12-bit address 000001001010 (octal 0112) with which it has just referenced memory to acquire a data word from said address. The program has specified that the memory address should be incremented by 1 for each subsequent transfer. Consequently, this address in the S register must have 1 added thereto so that at the next data transfer, the memory will be referenced at an address 000001001011 (octal 0113). The S register transfers the true value of its address into the R register via Ā gates 5–10 through 5–21. Looking now at FIGURE 6, the command signal $R\pm1$ To S becomes low to make high the output of I6–57. The command Inhibit $(R+1)$ To S is low making high the output of Ō6–58. Likewise, the signal $\overline{\text{Increment}}$ to Ā6–83 is low making its output high. Ā6–82 now follows the high output of Ā6–85 and produces the complement value 1 of the bit value 0 residing in the 0 stage of the R register. Ā6–82 is enabled to produce a low output at CP1 which places a binary 1 value into the O stage of the S register.

Whenever the bit in the R0 stage is 0 during an increment operation, there will never be any carry from the $2^0$ order to the $2^1$ order. Consequently, all final sum bits in binary orders $2^1$ through $2^{11}$ are identical to the bits held in the associated stages of the R register. For example, the low signal from the binary 1 output terminal of the R0 stage causes Ā6–22 to be high. Likewise, the output of Ō6–84 is high because the signal Inhibit $R+1$ ADD is low for an increment operation. Since a binary 1 is in R register stage 1, the other input to Ā6–11 is low, thus making its output high. Since all inputs to Ā6–35 are high its output is low, thus making the output of Ā6–

46 high. At CP1 therefore, $\overline{A}$6–59 goes low thus placing a binary 1 into the S stage 1. In binary order position $2^2$, $\overline{A}$6–23 has a high output because it, too, receives a low R0 signal. $\overline{A}$6–12 has one input high because of $\overline{A}$6–22, and its other input is also high because of the binary 0 value in R register stage 2. Consequently the output of $\overline{A}$6–12 goes low which in turn makes $\overline{A}$6–36 high. $\overline{A}$6–47 responds by going low so as to prevent $\overline{A}$6–60 from going low at CP1. Consequently, a binary 0 value is effectively placed into S register stage 2. In binary order $2^3$, $\overline{A}$6–24 is high because of the low R0 signal applied thereto. This permits $\overline{A}$6–37 to be governed by the content of R register stage 3 via $\overline{A}$6–13 so as to cause a binary 1 to be written into S register stage 3. Additionally, the output from $\overline{A}$6–24 is inverted to make low one input to each of the $\overline{A}$ gates 6–25 through 6–28, thus making their outputs high. It will therefore be seen that binary values are written into the S register corresponding to the sum bit values shown in Example 1 above.

Considering Example 2 shown above, where a binary 1 is in R register stage 0, $\overline{O}$6–84 now has a low output so as to make high $\overline{A}$6–11. Since a binary 1 is also in R register stage 1, $\overline{A}$6–22 becomes low, making high $\overline{A}$6–35 which in turn causes a binary 0 to be written into the S register stage 1. The low output from $\overline{A}$6–85 makes high $\overline{A}$6–82 so as to write a 0 value into the S register stage 0. The low output from $\overline{A}$6–22 means that a carry of 1 occurs from the $2^1$ stage to the $2^2$ stage. Consequently, $\overline{A}$6–12 is disabled and its output becomes high so that the S2 bit is determined therefore by the output from $\overline{A}$6–23. The value in R register stage 2 must be complemented because of the carry over. Since its value is 0, $\overline{A}$6–23 has a high output which makes $\overline{A}$6–36 go low. In turn this makes high the output of $\overline{A}$6–47, thus writing a binary 1 into S register stage 2. The high output from $\overline{A}$6–23 is indicative of the fact that no carry occurs between the $2^2$ and $2^3$ orders so that the remaining $R+1$ Adder circuitry merely causes the values in the higher order R stages to be transferred without change into the corresponding S register stages.

Turning now to a decrementing operation, assume that the same initial value 000001001010 (octal 0112) is employed in the S register to reference memory for data transfer. The next subsequent data transfer requires that the memory address be 1 less than the initial value, i.e. a new value of 000001001001 (octal 0111). Said decrementation is performed in the following manner. In FIGURE 5, the binary 1's complement of the initial value is transferred into the R register via $\overline{A}$ gates 5–30 through 5–41. These complement values are then applied to the $R+1$ Adder where 1 is added thereto in the manner described above in connection with Examples 1 and 2. However, for decrementing, the signal Inhibit $(R+1)$ To S in FIGURE 6 becomes high. Since the command $R\pm1$ To S continues low, the high output of I6–57 now makes the output of $\overline{O}$6–58 low to disable $\overline{A}$ gates 6–46 through 6–56. Also during decrementing, the command Inhibit $(R+1)'$ to S signal goes low to make $\overline{O}$6–81 high and so enable $\overline{A}$ gates 6–70 through 6–45 in Examples 1 and 2. However, there is no intermediate inversion between their outputs and the inputs to $\overline{A}$ gates 6–59 through 6–69. This means that the final sum values entered into the S register are complemented for Examples 3 and 4 relative to their values in Examples 1 and 2. Thus, an additional complementing step is performed, although the original raw sum bits are obtained in exactly the same fashion as they are obtained in the incrementing step.

Decrementing is also performed on the $R_K$ register content after each data transfer so as to keep track of the number of data transfers remaining in the input-output buffer operation. When this function is required, the complement value of the $R_K$ register is first transferred into the R register via $\overline{A}$ gates 5–50 through 5–57 in the same fashion as were the complemented values of the S register as has been previously described. The R register is then applied to the $R+1$ Adder where 1 is added to its contents. This time the command R′ To $R_K$ goes low so as to make high the output of $\overline{O}$6–81, thus enabling $\overline{A}$ gates 6–70 through 6–80. Since the output of $\overline{A}$ gates 6–70 through 6–76 are directed back to the input of the $R_K$ register, it is seen that the true value of the decremented $R_K$ count is placed into the $R_K$ register. However, the command $R\pm1$ To S is high during this $R_K$ decrement operation so as to prevent any entry into the S register of the $R_K$ count.

Since a decrementing operation is being performed all that is required for the low order stage $R_K$0 is that it be complemented. That is accomplished by transferring the complement of $R_K$0 to R0. The transfer takes place through $\overline{A}$5–50 when the command $R'_K$ to R occurs. Next, if R0 contains a binary one the content of R0 is transferred through $\overline{A}$4–20 to set $R_K$0 to a binary one. If R0 contains a 0, there is no transfer of $R_K$0. Since $R_K$0 is cleared to 0 before transfer occurs, it is merely left in this condition if R0 contains a 0.

The buffer process might also call for data transfers to be made using the same memory addres rather than sequential memory addresses. In this event, the command Inhibit $R+1$ Add becomes low so as to always make high the output of $\overline{O}$6–84. Also, I6–57 is high for this type of transfer. Furthermore, a high command $\overline{\text{Increment}}$ is applied to $\overline{A}$6–83 so that its output in turn is governed by the value in the R register stage 0. If a binary 0 is in said stage, then $\overline{A}$6–83 goes low to make high the output of $\overline{A}$6–82 and thus place 0 into the S0 stage. On the other hand, a binary 1 value in the R0 register stage causes the output of $\overline{A}$6–83 to go high which in turn places a binary 1 value into S0. The low command Inhibit $R+1$ Add also makes high the output of $\overline{A}$6–22 notwithstanding the other inputs thereto. Consequently, only $\overline{A}$ gates 6–11 through 6–21 are enabled which means that all R register values are transferred into the corresponding S register stages without change.

FIGURE 7 shows details of the repeat control circuits which are initially set by a Repeat instruction (function code 16) so as to govern the input-output buffered operation for the number of data transfers required. Generally, the Repeat instruction is executed in the following manner. The repeat register $R_K$ is set to a positive 8-bit value which has its two most significant bits in stages 6 and 7 equal to the two bit $b$ designator and its six least significant bits equal to the six bit $y$ designator of the Repeat instruction. The $a$ designator of the Repeat instruction word is interpreted in different ways according to the modification required on the operand address Y$b$ of the next following instruction word Enter Channel 1 for each buffered data transfer.

$a=0$ do not modify the operand Y$b$, i.e. the memory address to or from which data transfers are made is never changed for the entire buffer operation.

$a=1$ Increment Y$b$ of the next instruction (Enter Channel 1 in this case) by 1 after every iteration, i.e. data transfers are made to or from adjacent memory locations beginning with the lowest address.

$a=2$ Decrement of Y$b$ of the next instruction by 1 after every iteration, i.e., data transfers are made to and from adjacent memory locations beginning with the highest address.

When the Y$b$ of the next following instruction is to be modified after each iteration according to the above interpretation of the $a$ designator of the Repeat instruction, the modification takes place in the R register and $R+1$ Adder in the manner heretofore described in connection with FIGURES 4, 5, and 6.

If the *a* designator of the Repeat instruction is equal to 3, then a buffered I/O operation cannot be initiated even if followed by an Enter Channel 1 instruction. Instead, such an instruction is termed a Buffer Active Jump having the following function. If the repeat count in register $R_K$ is equal to 0, a jump is made to the address specified by the *b* and *y* designators for the current interrupt level; if $R_K$ is not=0, then the next instruction is taken in sequence. This alternative interpretation of the Repeat instruction whose $a=3$ does not comprise part of the present invention and so will not be discussed further.

In FIGURE 7, flip-flop 7–10 is set ON during the execution of a Repeat instruction if *a* designator there is not equal to 3. This is performed at time T7 of memory cycle SC3 when the output of $\overline{A}$7–11 goes low and is inverted via I7–12 to make one input of $\overline{A}$7–13 high. By this time the Repeat instruction is now in the U register and the function designator is decoded to produce a high signal $f=16$, making another input to $\overline{A}$7–13 high. If the *a* designator of said Repeat instruction is equal to 3, then both inputs to $\overline{O}$7–14 are high making its output low and thus preventing a significant low output from $\overline{A}$7–13. On the other hand, for any *a* designator equal to 0, 1, or 2, at least one input to $\overline{O}$7–14 is low which then permits the enabling of $\overline{A}$7–13. Consequently, a low output from $\overline{A}$7–13, as inverted by I7–15, is clocked at CP1 to set FF7–10. However, prior to setting FF7–10, $\overline{A}$7–17 is enabled at CP4 time during this SC3–T7 period to first clear FF7–10 for any function code 14, 16, or 17 as determined by the two input signals $f=14$–17 and $f\neq 1$, 5, 11, 15. The low output from $\overline{A}$7–13 is also applied directly to the $R_K$ register in order to first clear same by command Clear $R_K-1$ and then transfer the lower 8 stages 0–7 of the U register into the $R_K$ register by the command $U_L$ to $R_K$. This places the *b* designator and *y* designator of the Repeat instruction into the $R_K$ register to provide an initial count from which 1 is subtracted for each data transfer in order to keep track of the number of remaining data transfers required in the buffer operation.

Flip-flops 7–18 and 7–19 respectively remember whether the memory address is to be incremented or decremented during succeeding buffer data transfers. At the time that the Repeat instruction is held in the U register, the high signal $f=16$ is applied both to $\overline{A}$ gates 7–20 and 7–21, along with a high signal from I7–12 during the period T7–SC3. If the *a* designator of the Repeat instruction is any value other than 3, then $\overline{A}$7–22 must have a high output because at least one of its inputs from stages 8 and 9 of the U register is low due to a binary 0 value therein. If the *a* designator is equal to 1, then a high signal from U8 is applied to $\overline{A}$7–20 which in turn is gated by CP1 to set FF7–18. On the other hand, if the *a* designator is equal to 2, then a high signal U9 is applied to $\overline{A}$7–21 to set FF7–19. When the *a* designator is equal to 0, then neither $\overline{A}$7–20 nor $\overline{A}$7–21 can produce a low output so that both flip-flops 7–18 and 7–19 remain in their Clear condition having there been placed by an output from $\overline{A}$7–63 at CP4.

When both FF7–18 and FF7–19 remain Clear (thus indicating $a=0$ in the Repeat instruction), $\overline{A}$7–23 has all positive inputs to produce a low output therefrom. This low output is labelled Inhibit $R\pm 1$ Add which is applied to $\overline{O}$6–84 in the $R+1$ Adder in order to permit direct transfer of the R register to the S register without change in value as has heretofore been described. Also, a low output from $\overline{A}$7–23 when applied to $\overline{O}$7–24 causes a significant high output Inhibit $(R+1)'$ To S also used in the $R+1$ Adder ($\overline{O}$6–81) in the manner previously described. However, a third input to $\overline{A}$7–23 from $\overline{A}$7–48 (subsequently discussed) goes low whenever the $R_K$ count is to be decremented, thus making high the output of $\overline{A}$7–23 just for this brief period of time. This high output from $\overline{O}$7–24 may also be obtained by setting FF7–18 to 1 for an increment operation, since at that time the 0 output terminal of said flip-flop goes low. An output is further taken directly from 0 output terminal of FF7–18 labelled $\overline{\text{Increment}}$ which is high only when the memory address is not to be incremented. Two outputs taken directly from the 1 terminal of FF7–19, one being labelled Decrement and the other being Inhibit $(R+1)$ To S are employed by $\overline{O}$6–58 in the $R+1$ Adder in the manner previously described.

Following the execution of the Repeat instruction, the next instruction withdrawn is an Enter Channel 1 (function code=10). During execution of this instruction the S register is loaded with the value specified by *b* and *y* for the current interrupt level, and certain other circuits of FIGURE 7 are actuated in order to govern the subsequent I/O Buffer operation. FF7–25 is set to 1 at CP1 by this Enter Channel 1 instruction via $\overline{A}$7–26 only if said instruction immediately follows the above described Repeat instruction. This is so, since $\overline{A}$7–26 requires a high output from the 1 terminal of FF7–10 before it can possibly set the FF7–25 to 1. $\overline{A}$7–26 further requires a function code of 10 in the U register as indicated by the application of high signals $f=0$, 4, 10, 14, and $f=10$. Another high input is required from I7–27 which is only produced when $\overline{A}$7–28 goes low. $\overline{A}$7–28 in turn produces a low signal only when the function code is less than $14(f<14)$ at a time commencing with clock CP3 during T1, and then all of T2 in memory cycle SC5. This latter timing is governed by the components $\overline{A}$7–29, $\overline{O}$7–30, $\overline{A}$7–31, and I7–32. Another requirement for $\overline{A}$7–28 is that FF7–33 be in a Clear condition. However, as soon as FF7–25 is set, the low output from its 0 terminal causes I7–34 to go high which in turn permits $\overline{A}$7–35 to set FF7–33 at the next following CP3. $\overline{A}$7–35 also clears FF7–10. Thus, once FF7–33 is set, it prevents any further low signal from $\overline{A}$7–26 until the conclusion of the buffer I/O process when FF7–25 is finally cleared by an output from $\overline{A}$7–36 (due to the number in the $R_K$ register going to zero).

With FF7–25 set to 1 by the Enter Channel 1 instruction, various signals can now be produced to govern the succeeding data transfers. For example, $\overline{A}$7–37 is enabled by a high command Buffer Request each time that a memory reference must be made for a data transfer, so as to produce a low output which can effectively interrupt the execution of some current program instruction word for one memory cycle. Said low output from $\overline{A}$7–37 is inverted by I7–38 and then applied both to $\overline{A}$7–39 and $\overline{A}$7–40. Whenever the current instruction cycle arrives at a memory cycle SC0 or SC3, then $\overline{O}$7–4 has at least one low input thereto which produces a high output also applied to said two $\overline{A}$ gates. If there is no current instruction cycle, then a low Command $\overline{\text{End Instruction}}$ causes said high output from $\overline{O}$7–41. At T7 time during SC0, SC3, or between instruction cycles, $\overline{A}$7–40 is enabled by CP1 (under the assumption that the current instruction does not have a function code $f=16$) to thereby set FF7–42. $\overline{A}$7–39 also produces a low output which disables the Sequence Advance counter, causing it to repeat the particular memory cycle SC0 or SC3 for a current instruction cycle. FF7–42 remains on for one complete memory cycle and then is turned off at the next following T7–CP1 time by operation of $\overline{A}$7–43. This last $\overline{A}$ gate goes low because by this time the Buffer Request Command to $\overline{A}$7–37 will have disappeared, thus rendering low the output from I7–38 which in turn makes high the output from $\overline{A}$7–39.

During the time that FF7–42 is set, it permits various command signals to perform a variety of functions relating to the actual transfer of data between memory and the single register stage in the I/O Comm. unit. FF7–42 further permits operation of the $R_K$, R, and S registers in order to effect any required change in the memory address and also to decrement the $R_K$ count. To describe briefly how some of these functions are performed, it is seen that a high output from the 1 terminal of FF7–42 permits Ā7–44 to go low (in the presence of a NOT Reference D clock signal more fully described in the above identified application A but not pertinent to the present invention). The low output from Ā7–44 in turn is inverted by I7–45 and applied to Ā7–46. When Ā7–46 goes low, two significant signals Channel 1 To Z and Buffer Grant are generated. The low output from Ā7–44 is also inverted by I7–47 and applied to Ā7–48 for producing at a T5 time three commands Clear $R_K$—2, $(R+1)'$ To $R_K$, and R' To $R_K$ used in decrementing the $R_K$ count by one in the manner heretofore described in connection with FIGURES 4 through 6. The remaining gates in FIGURE 7 will be more fully described when the entire operation of the invention is discussed in detail in subsequent paragraphs.

FIGURE 8 shows details of the novel I/O Comm. unit which comprises the heart of the present invention. This unit provides the interface coupling between the external data subset and the internal computer system, and together with one of the two circuits shown in FIGURES 9 and 10 (subsequently described) consists generally of a two-bit function register for the *a* designator portion of the Enter Channel 1 instruction, a one-bit data register for accepting one bit at a time for transfer between the external subset and the computer memory, and control logic.

First to be described in FIGURE 8 are the two flip-flops 8–10 and 8–11 which respectively hold the lower and highest order bits of the *a* designator portion of the Enter Channel 1 instruction hereafter referred to as *a. Said bits are gated into these flip-flops from respective U register stages 8 and 9 at the time when the Enter Channel 1 instruction resides in the U register during its executing instruction cycle. When a low Channel 1 Start signal is generated from FIGURE 3, it is inverted by I8–12 and applied to Ā gates 8–13, 8–14, and 8–15. Ā8–14 is clocked at CP2 to insure that flip-flops 8–10 and 8–11 are cleared prior to entering information from the U register. At the next following CP3, Ā gates 8–13 and 8–15 are enabled to set these flip-flops only if there are binary 1 values residing in the associated U register stages 8 and 9. Consequently, if both flip-flops 8–10 and 8–11** remain clear after said transfer, this indicates that the *a* designator of the Enter Channel 1 instruction (*a) is equal to 0. With FF8–10 set to 1 and FF8–11** set to 0, $a^*=1$. Similarly, a 1 value in FF8–11 and a 0 value in FF8–10 gives $a^*=2$, while $a^*=3$ if both said flip-flops are set to 1.

When *a equals either 1 or 3, the operation called for is a transfer from the computer to the external subset. Consequently, a low Request To Send signal must be emitted from the computer to the subset in order to inform the latter of the need for, and direction of, transfer. A driver amplifier 8–16 is responsive to a low input thereto from the binary 0 terminal of FF8–10 in order to generate said Request To Send, since FF8–10 is set to 1** whenever *a** is equal to either 1 or 3. Furthermore, when $a^*=3$, there is also a continuous emission of a New Sync command to the external subset which, during its presence, prevents the subset from responding to line signals. This signal is provided by a driver 8–17 which is energized by the enabling of Ā8–18 in response to binary 1 values in both FF8–10 and FF8–11. An $a^*=2$ value indicates that the data transfer is made from the subset to the computer under the control of the subset. For this value, FF8–10 contains a 0 which applies one high input of Ā8–19. When a second high input is also applied thereto from I8–20 due to a low command presence of a high signal provided by I8–20 in Buffer Channel 1, a low command Channel 1 Input Buffer is generated for use in FIGURE 7.

A single I/O Channel 1 register stage comprised of flip-flop 8–21, is used to store each serially transmitted data bit to or from the external subset. Consequently, there are two sources of input to FF8–21 as well as two ultimate destinations to which its contents are directed. Ā gate 8–22 is used to clear FF8–21 at CP2 just prior to entry therein of an information bit. Ā8–23 can then be clocked at CP3 to transmit one bit from 1 output terminal of stage 0 of the Z register into FF8–21. Consequently, Ā8–23 is used during a Send buffer operation where data is transmitted from the computer to the subset. On the other hand, Ā8–24 can enter a bit appearing on the Receive Data line from the subset via driver 8–68. The respective enabling of Ā gates 8–23 and 8–24 is controlled by the logic gates Ō8–25, Ō8–26, and I8–27 described in detail in subsequent paragraphs.

When information is to be transmitted from FF8–21 to the external subset, Ā8–28 is enabled by setting FF8–29 to 1 in order to apply the content of FF8–21 to a line driver 8–30 which in turn is connected to the Send Data line going to the subset. FF8–29 can only be set by the enabling of Ā8–38 at CP3 for the condition where $a^*=1$ or 3, as indicated by a binary 1 stored in FF8–10. It also requires the initiation of a signal Clear To Send coming from the subset and applied to Ā8–38 via a driver amplifier 8–67. The setting FF8–29 is also dependent upon synchronization with the Send Clock signal subsequently to be described. On the other hand, where the data transfers are made from the subset to the computer, i.e. the Receive Mode of operation, then the bit held in FF8–21, as derived from the subset via Ā8–24, is subsequently transferred to the 0 stage of the Z register from whence it will be written into memory. This transfer from FF8–21 to the Z register is made through Ā8–31, I8–32, and Ā8–33, the latter in turn setting said Z register stage 0 to a binary 1 value when enabled by CP1 and a high output from I8–34. I8–34 is so enabled for a low output from Ā8–35 occurring at a T4 time in the presence of a C to Z command applied via I8–36. Furthermore, Ā8–31 also requires an additional enabling high signal from I8–37 which occurs for a low command Channel 1 to Z.

Two other control flip-flops 8–39 and 8–46 in FIGURE 8 remain to be described. FF8–39 is set to 1 by Ā8–40 for generating the Buffer Request command (applied to Ā7–37) whenever the memory unit of the computer is required to reference a location thereof according to an address held in the S register. In the case of a Send operation, where the computer must place a data bit into FF8–21 for subsequent transmission to the subset, this Buffer Request normally occurs immediately after FF8–21 has been sampled by the external subset, so that the content thereof may be replaced with the next following data bit from the computer. On the other hand, when the Receive mode of transfer is carried out by the I/O Comm. unit, FF8–39 is set to 1 immediately after a bit transfer has been made to FF8–21 from the subset. Ā8–41 clears FF8–39 at the conclusion of the memory reference cycle. For a Send operation, FF8–29 is set to 1 as has previously been described so that the low signal from its 0 output terminal, when applied to Ā8–42, continuously generates a high output therefrom. This makes Ā8–40 responsive only to the leading edge of the Send Clock signal, as will subsequently be described, since a low signal $\overline{\text{Buffer Channel 1}}$ applied to I8–43 is always present during a buffer operation. On the other hand, during a Receive operation when FF8–29 is set to 0, a high output from Ā8–42 depends on the presence of a high Carrier On signal from the subset and applied to the circuit via a driver 8–44 and I8–45. For this case, FF8–39 is actually set upon occurrence of the leading edge of the Receive Clock signal as will subsequently be described.

With reference now to FF8–46, it is set to 1 immediately after memory has been addressed for a data word which is to be placed into FF8–21. FF8–46 is therefore set to 1 by Ā8–47 at CP4 during time T7 of that memory cycle in which a memory reference is made for said data word. This memory cycle is identified by a low signal Buffer Grant applied to I8–48 whose output in turn is high to permit the said enabling of Ā8–47. In any other memory cycle the Buffer Grant command is absent, i.e. high, to thereby continuously enable Ā8–49 and keep FF8–46 in its Clear condition. It is only when FF8–46 is set that the output from Ō8–25 goes high to permit a transfer of information from Z0 into FF8–21.

Flip-flops 8–50 and 8–51 are employed to sense the leading edge of the Clock signals as they are produced by either one of the circuits in FIGURES 9 and 10. Ō8–52 has applied thereto the signals Clock–2 and Clock–3, which are respectively present for Receive and Send modes if the synchronous operating circuit of FIGURE 10 is employed, but only one of which (Clock–2) is present during both modes if the non-synchronous circuit of FIGURE 9 is employed. The Clock–1 signal also shown entering FIGURE 8 is always present during the Receive mode for either the FIGURE 9 or FIGURE 10 circuit, but is present for the Send mode only if FIGURE 9 is used. Clock–1 is 180° out of phase compared to either Clock–2 or Clock–3. Consequently, when Clock–2 is high, Clock–1 is low, and vice versa. Ō8–52 is inverted by I8–53, with the outputs of these two gates being applied via respective input gates to flip-flops 8–50 and 8–51. FF8–50 has four Ā gates 8–54, 8–55, 8–56, and 8–57, the first two being employed to set the flip-flop to its binary 1 state while the latter two clear the flip-flop to its 0 state. FF8–51 has a single set Ā gate 8–58, and a single clear Ā8–59. The output from Ō8–52 is applied to Ā gates 8–54, 8–57, and 8–58, while the output from I8–53 is applied to Ā gates 8–55, 8–56, and 8–59. All four gates connected to FF8–50 are simultaneously clocked with CP4, while the two gates to FF8–51 are clocked by CP2.

The table given below readily demonstrates the operation of flip-flops 8–50 and 8–51 in determining the approximate time of occurrence of a change in the entering signal Clock–2 or, for that matter, Clock–3 where the FIGURE 10 circuit is being used during a Send mode of transmission.

| | Clock–2 | CP | FF8–50 | FF8–51 |
|---|---|---|---|---|
| 1 | – | 2 | 0 | 0 |
| 2 | – | 4 | 1 | 0 |
| 3 | – | 2 | 1 | 1 |
| 4 | – | 4 | 0 | 1 |
| 5 | – | 2 | 0 | 1 |
| 6 | – | 4 | 0 | 1 |
| 7 | + | 2 | 0 | 1 |
| 8 | + | 4 | 1 | 1 |
| 9 | + | 2 | 1 | 0 |
| 10 | + | 4 | 0 | 0 |
| 11 | + | 2 | 0 | 0 |
| 12 | + | 4 | 0 | 0 |
| 13 | – | 4 | 1 | 0 |
| 14 | – | 2 | 1 | 1 |
| 15 | – | 4 | 0 | 1 |
| 16 | – | 2 | 0 | 1 |

Assume for this example that only Clock–2 is an active signal to Ō8–52, with the Clock–3 signal input conductor being tied to a source of high potential as shown in FIGURE 9. The table above has five columns which, beginning from the left, specify (1) lines or rows in the table, (2) the polarity of the Clock–2 signal, (3) CP signals, and the respective states of (4) flip-flops 8–50 and (5) 8–51. If both said flip-flops are in their 0 states, assume that at some CP2 time the Clock–2 signal to Ō8–52 becomes low or goes negative as indicated in line 1 of the table. This makes the output of Ō8–52 high and the output of I–53 low. Since FF8–50 is in a 0 condition, Ā8–58 cannot be enabled by said CP2 and so prevents any change in state of FF8–51. At the next following CP4 (line 2) the still high output from Ō8–52 permits Ā8–54 to be enabled because FF8–51 is in its 0 condition. Consequently FF8–50 is set to 1 as indicated in the table. At the next following CP2 (line 3) Ā8–58 can now set FF8–51 to 1 because all inputs thereto, including that from the binary 1 output terminal of FF8–50, are high. With FF8–51 now set to 1, the next following CP4 (line 4) enables Ā8–57 to clear FF8–50 back to its 0 condition. Line 5 of the table shows that there can be no change in FF8–51 at the next following CP2 because of the 0 state of FF8–50. At the next following CP4 (line 6), Ā8–54 is now unable to set FF8–50 to a 1 condition because by this time FF8–51 is in a 1 condition. It will thus be appreciated that once FF8–51 has been set into its 1 condition and FF8–50 returned to its 0 state, no further changes occur in these two flip-flops as long as the Clock–2 signal remains low.

The above table commences again at line 7 where it is assumed that the Clock–2 signal went high at some time, for example CP1, immediately preceding the CP2 of line 7. This makes the output of Ō8–52 low and in turn raises the output of I8–53. However, there is no change in the state of FF8–51 in line 7 because FF8–51 at this time holds a 0 value. In line 8, the next following CP4 sets the FF8–50 to 1 by action of Ā8–55 which is enabled by the now high output from I8–53 and the high output from FF8–51. At the next following CP2, Ā8–59 now has all high inputs thereto so as to clear FF8–51 back to 0, as shown in line 9 of the table. At the following CP4 (line 10), the now cleared condition of FF8–51 permits Ā8–56, along with the high output from I8–53, to clear FF8–50 back to 0. Lines 11 and 12 of the table further show that there is no further change of the flip-flop states as long as the Clock–2 signal continues to remain high.

The table concludes with lines 13–16 showing once again a low Clock–2 signal. Assume that the Clock–2 signal went from + to – (high to low) at a CP3 time immediately preceding the CP4 time of line 13. At said CP4, therefore, the high output from Ō8–52, coupled with the Clear condition of FF8–51, permits Ā8–54 to set FF8–50 to 1. At the next following CP2 (line 14) Ā8–58 also sets FF8–51 to 1 so that at the next CP4 (line 15), Ā8–57 once again clears FF8–50. No further changes occur in the flip-flops until the Clock–2 signal once again goes high, as has previously been described in connection with lines 7–12 of the table.

Before terminating the description of FIGURE 8, several remaining Ā gates will be briefly described. Ā8–60 is responsive to the clear states of FF8–10 and FF8–11 ($a^*=0$) in order to generate an Interrupt 7 signal (actually clocked by CP2 at Ā8–63) at the appearance of the positive going edge of a Clock–1 signal, which edge is indicated by FF8–50 being set to 1 during the time when Clock–1 is high. This Interrupt 7 only occurs when the I/O Comm. unit is in a quiescent condition, i.e., no current Channel 1 buffer operation being performed, and the data subset desires to send information to the computer. When the Interrupt 7 signal is applied to the I register, it interrupts the execution of the current program in order to shift to the program contained in level 7 thereof. The first instruction of this level 7 program is a Repeat ($f=16$) instruction which sets up the circuits of FIGURE 7 as has been previously described. The second instruction of the level 7 program is an Enter Channel 1 instruction ($f=10$) with $a^*=2$, indicating a Receive mode of transfer. In this way FF8–10 and FF8–11 can be loaded with $a^*=2$ in order to transfer information from the subset to the computer. Ā8–61 provides an Interrupt 6 signal to the computer I register (via Ā8–65) whenever flip-flops 8–10 and 8–11 contain $a^*=2$ and the Carrier On signal suddenly disappears, as might be the case after receipt of a few spurious noise caused bits. If this does occur, the Receive operation must be terminated by going to the buffer terminating instructions found in program level 6.

FIGURES 9 and 10 show alternative ways of generating the Clock–1, Clock–2, and Clock–3 signals applied to FIGURE 8. For non-synchronous systems timing, two out of phase square clock wave signals Clock–1 and Clock–2 are generated by a multivibrator oscillator 9–10 which is located in the I/O Comm. unit. The Clock–3 lead is continuously tied to a + voltage in order to prevent it from influencing gate $\overline{\text{O}}$8–52 which in turn is only driven by the Clock–2 signal for non-synchronous operation. This multivibrator 9–10 in an unactivated state produces a continuously high Clock–2 signal and commences to run at the proper bit transfer frequency only when a low input signal is applied thereto from I9–11. For this to occur, 19–11 must receive a high output from the 1 terminal of a flip-flop 9–12 which is set on in two different ways. When a Send operation is dictated by virtue of $a^*=1$ or 3, a low signal Start Clock is applied to FF9–12 from the output of $\overline{\text{A}}$8–13 in FIGURE 8 which indicates that a binary 1 value is now being entered into FF8–10. On the other hand, if the data subset requests that it be allowed to transmit information to the computer ($a^*=2$), $\overline{\text{A}}$9–13 is enabled only upon receipt of a high Carrier On signal from the data subset as well as a high indication appearing on the normally low Receive Data line from said subset. When multivibrator 9–10 is energized, the Clock–1 and Clock–2 signals run 180° out of phase. These signals are applied to the indicated leads in FIGURE 8. The clock–2 signal is also directed back to $\overline{\text{A}}$ gate 9–14. If a buffer operation is occurring, then a $\overline{\text{Buffer Channel 1}}$ signal is down so as to continuously produce a high output from $\overline{\text{A}}$9–14, notwithstanding the polarity of the Clock–2 signal applied thereto. A high signal from $\overline{\text{A}}$9–14 prevents FF9–12 from being cleared to its 0 value until the buffer operation is completed. However, when the $\overline{\text{Buffer Channel 1}}$ signal is high, the next positive swing of the Clock–2 signal enables $\overline{\text{A}}$9–14 to clear FF9–12 and thus discontinue the clock input to FIGURE 8.

For timing in a synchronous system, a pair of timing square wave signals Send Clock and Receive Clock are applied to the I/O Comm. circuit in FIGURE 10 from the data subset. However, only one of these clocks is allowed to enter FIGURE 8 depending on whether information is to be transferred to or from the subset. Thus, when FF8–10 is set to 1, thus indicating $a^*=1$ or 3, a high input is applied to $\overline{\text{A}}$10–10 for passing the Send Clock signal from a driver amplifier 10–11. The output of $\overline{\text{A}}$10–10 is labelled Clock–3 and is used in FIGURE 8 at gate $\overline{\text{O}}$8–52, rather than the Clock–2 signal from $\overline{\text{A}}$10–12 which remains high because of the now low signal $a^*=0$, 2 applied thereto from FF8–10. For a Receive mode of transmission, FF8–10 remains clear so that the $a^*=0$, 2 signal from its 0 output terminal is now high. This signal is applied to $\overline{\text{A}}$10–12 which also receives a low Carrier On signal from the subset, as well as the Receive Clock signal applied via driver amplifier 10–13. Thus, $\overline{\text{A}}$10–12 goes low each time that the Receive Clock goes high, and vice versa. The direct output from $\overline{\text{A}}$10–12 is labelled Clock–2 (used in FIGURE 8), while the inverted output from I10–14 is labelled Clock–1 and is used in generating the Interrupt 7 signal. Since the signal $a^*=1$, 3 is always low for the Receive mode, $\overline{\text{A}}$10–10 continuously produces a high Clock–3 signal.

*Operation*

The overall operation of the invention will now be described with particular reference to the timing diagrams shown in FIGURES 11 and 12. The bits to be serially transmitted between the computer and the external data subset are also assumed to be 10110 in that order, as shown in the table accompanying the brief theory of system operation found just before the description of FIGURE 2. FIGURE 11, which will first be discussed, shows operating times of certain control flip-flops during a Send mode of transmission as well as showing the content of certain registers therein. For a Send mode of operation, there must first be executed a Repeat instruction ($f=16$, with $a=0$, 1, or 2) followed immediately by an Enter Channel 1 instruction ($f=10$) whose $a^*$ designator is either 1 or 3. Assume now that the Repeat Instruction has been acquired from memory during the processing of an instruction cycle of some intermediate interrupt level program so as to reside in the U register by memory cycle SC3 of said instruction cycle. At time T7 of SC3, $\overline{\text{A}}$7–11 goes low, thereupon enabling $\overline{\text{A}}$7–13 because of $f=16$ now held in the U register. Furthermore, it has been assumed that the $a$ designator of the Repeat instruction is other than 3, so that $\overline{\text{O}}$7–14 produces a high output therefrom. $\overline{\text{A}}$7–17 now has all inputs positive and is clocked at CP4 to initially insure that FF7–10 is cleared. At the next following CP1, $\overline{\text{A}}$7–16 sets FF7–10 which in turn indicates that the current instruction is to be interpreted as the repeat control for the next following instruction. Enabling of $\overline{\text{A}}$7–13 also generates the commands $U_L$ To $R_K$ and Clear $R_K-1$. The latter signal makes high the output of $\overline{\text{O}}$4–31 so as to clear the $R_K$ register at CP4. At the next following CP1, $\overline{\text{A}}$ gates 4–10 through 4–17 are opened to permit entry of the contents in U register stages U0–U7 into $R_K$ register stages 0–7, respectively. Consequently, a number has now been entered into the $R_K$ register made up of the $y$ and $b$ designator portions of the Repeat instruction. This number will be decremented by 1 for each data transfer made from the computer to the subset, beginning with the second such transfer (i.e. the first buffer operation), and consequently controls the number of such transfers to be made before the Send operation is completed. In FIGURE 11, the assumption is made, for purposes of this description only, that the number so placed in $R_K$ is 005 (octal) such that $R_K$ stages 0 and 2 are set to 1, while all other $R_K$ stages remain in their cleared 0 condition.

The $a$ designator of the Repeat instruction is also translated during this SC3–T7 time by gates $\overline{\text{A}}$7–20 and 7–21. Thus, if $a$ equals 1, then $\overline{\text{A}}$7–20 is gated at CP1 to set FF7–18, thus indicating that the repeated operand addresses are to be incremented. On the other hand, if $a=2$, then $\overline{\text{A}}$7–21 is gated at CP1 to set FF7–19 thus indicating that the repeated operand address is to be decremented by 1 for each data transfer. If $a=0$, then neither FF7–18 nor FF7–19 is set, which in turn causes $\overline{\text{A}}$7–23 to maintain a low output (except for the $R_K$ subtraction) in order to continuously transfer the same data bit to the subset.

The instruction cycle for this Repeat instruction concludes, and the next following instruction word from the same interrupt program level is withdrawn. This next instruction is Enter Channel 1 ($f=10$) with an $a^*$ designator of either 1 or 3. The upper half of this instruction cycle is acquired during SC3 of its instruction cycle and is placed into the upper stages of the U register at CP2 of the SC3–T6 period. Consequently, $\overline{\text{A}}$7–26 is enabled at the next following CP1 by the $f=10$ function code to set FF7–25. After FF7–25 has been set, $\overline{\text{A}}$7–35 sets FF7–33 by the next following CP3 and further clears FF7–10.

During SC4 of the Enter Channel 1 instruction cycle, the B register contents are obtained from memory so that during SC5 of said instruction cycle, a 7-bit data word may be obtained from a particular address location in memory as specified by $\underline{Yb}$ of the Enter Channel 1 instruction. Let it be assumed that said memory address $\underline{Yb}$ is 0067 (octal). This 7-bit data word is entered into the Z register sometime during SC5, but only the Z0 bit of same will be ultimately transferred to the data subset. Also, the address 0067 in the S register, from which said 7-bit data word was extracted, must be transferred into the R register and saved in order to provide sequential memory addresses from which subsequent data transfers are to be made. This latter function is carried out in the following manner. At SC5 of the Enter Channel 1 instruction cycle, $\overline{A}$7–50 is enabled to make high the output of $\overline{O}$7–51. This in turn permits $\overline{A}$7–52 to produce the command Clear R–2 at SC5–T6 so as to clear the R register by CP3 time of its previous contents. The high output from $\overline{O}$7–51 is further applied to $\overline{A}$ gates 7–53 and 7–54. If FF7–19 is set to 0, thus indicating by itself that a repeated operand address must be either incremented or not modified at all, then $\overline{A}$7–54 generates the low command S To R at T7 time to transfer the true value in the S register into the R register. On the other hand, if the *a* designator of the Repeat instruction had been equal to 2 so as to have set on FF7–19, $\overline{A}$7–54 cannot be enabled. A high output from $\overline{A}$7–54 permits $\overline{A}$7–53 to generate the command S′ To R and so transfer the binary 1's complement of the S register into the R register in preparation for a subsequent decrementing operation. Consequently, as shown in FIGURE 11, the R register will hold either 0067 (the true octal value of the initial memory address) or it will hold octal value 7710 which is the complement of said true octal value 0067.

The *a designator of the Enter Channel 1 instruction must also be transferred into flip-flops 8–10 and 8–11 to govern the mode of transfer. During the SC5–T7 period of the Enter Channel 1 instruction cycle, FF3–28 is set on at CP4 and then remains in that condition until the next following CP4 when it is cleared by $\overline{A}$3–29. During the time that FF3–28 is on, the Channel 1 Start and Clear Channel 1 signals are generated by $\overline{A}$3–30** since the function code *f* is equal to 10 during this instruction cycle. $\overline{A}$ gates 8–13 and 8–15 are now enabled at the following CP3 to place the *a designator into respective flip-flops 8–10 and 8–11. FF8–10** is set on for *a=1 or 3, while FF8–11** is set on if *a=2 or 3. Furthermore, the low Clear Channel 1 signal makes the output of $\overline{O}$8–25 go high so as to permit the clearing of the single data stage FF8–21 at CP2. Thus, this data stage is cleared of its previous contents so that at the next following CP3, $\overline{A}$8–23 passes in the bit value now residing in the 0 stage of the Z register. Under the assumption previously made, this bit has the value of 1 to therefore set FF8–21 to 1. The remaining bits in the Z register stages 1–6** are not gated to the I/O Comm. unit and so will not be transmitted to the external data subset.

A low Start Clock signal from $\overline{A}$8–13, thus indicating *a=1 or 3, also sets FF9–12 to 1 (where non-synchronous operation is provided) to thereby energize multivibrator 9–10 and so begin generating the Clock–1 and Clock–2 signals. Since FF7–25 is in its 1 state, the $\overline{\text{Buffer Channel 1}}$ signal to $\overline{A}$9–14 is low to thereby maintain FF9–12 in its 1 condition. However, if synchronous operation is instead provided, then the setting of FF8–10** makes high the signal *a=1, 3, and so permits $\overline{A}$10–10 to pass the Send Clock signal from the subset in order to produce only the Clock–3** signal. For the purpose of this discussion, however, use of FIGURE 9 will be assumed.

Once a data bit from memory has been placed into FF8–21, the computer continues processing instructions from either the current interrupt program level or any other program level to which a jump may be made. The data bit in FF8–21 remains there until the data subset is conditioned to accept it, after which the execution of the computer program is interrupted for one memory cycle in order to withdraw a second data word from memory, the 0 position bit of which will then be placed into FF8–21 for subsequent transfer to the subset. This buffer operation will now be described.

When FF8–10 is set to 1, the Request To Send signal is generated from driver 8–16 and applied to the data subset indicating that a data bit now resides in FF8–21. If *a=3, then driver 8–17 also is energized to generate the New Sync signal. When the data subset is ready to sample the content of FF8–21, it produces a high Clear To Send signal applied via driver 8–67 to one input of $\overline{A}$8–38. $\overline{A}$8–38 also receives a high input from the 1 output terminal of FF8–10. All that is further needed by $\overline{A}$8–38 are high inputs from FF8–50 and $\overline{O}$8–52. Assume now that the Clear To Send signal is first initiated during a low Clock–2 signal which makes high the output of $\overline{O}$8–52. Further assume that this low condition of Clock–2 has been present long enough, prior to the initiation of the Clear To Send signal, such that FF8–50 is in its 0 condition by the time that the Clear To Send signal begins, and FF8–51 is in its 1 condition. Consequently, one input signal to $\overline{A}$8–38 is low so that it is not enabled at CP3 immediately following said initiation of the Clear To Send signal. Eventually, however, the Clock–2 signal goes positive, thus making the output of $\overline{O}$8–52 go negative and initiating a temporary operation of FF8–50. Although FF8–50 is set to 1 for four CP pulse times immediately after the Clock–2 signal goes positive, the now negative output from $\overline{O}$8–52 still maintains $\overline{A}$8–38 in a disabled condition so as to prevent the setting of FF8–29. Thus, during all this time the Clear To Send signal is continuous but has not yet permitted the content of FF8–21 to be gated on to the Send Data line via $\overline{A}$8–28. Clock–2 subsequently once again goes low, with this condition being shown in FIGURE 11 at an assumed CP1 time of the internal computer clock system. To digress but a moment, if FIGURE 10 (synchronous) were being employed here, the corresponding negative excursion of Clock–3 is equivalent to a positive excursion of the Send Clock signal from the data subset during the leading edge of which information can be accepted by said data subset. Returning now to the original assumption of using FIGURE 9, in FIGURE 11 it is seen that FF8–29 is still in a Clear condition for this leading edge of the negative half cycle of Clock–2. Immediately after Clock–2 goes low, FF8–50 is set On to 1 at the next following CP4, with FF8–51 being then set on at the next following CP2. With FF8–50 in the 1 condition and with $\overline{O}$8–52 now generating a high output, $\overline{A}$8–38 is enabled at the next following CP3 to set FF8–29 six CP times after the Clock–2 signal first went negative. Although this now permits $\overline{A}$8–28 to transfer the content of FF8–21 to driver 8–30, it is done so too late for the data subset to have received the 1 bit on the leading edge of the Clock–2 negative excursion just described (which, when Clock–3 is instead being used, is equivalent to the leading positive going edge of the first half cycle of the signal Send Clock). Consequently, there should be no change in the content of FF8–21 until the next leading edge of a negative Clock–2 excursion, which is here assumed to occur by CP3 at some future time. By this time, $\overline{A}$8–28 is already gated open, thus placing on the Send Data line the content of FF8–21 which is thereupon accepted by the data subset. Furthermore, $\overline{A}$8–40 now becomes enabled at the next following CP2 to set FF8–39 and so generate a Buffer Request signal. This Buffer Request signal asks that the computer processing of the current instruction program be interrupted for one memory cycle so that a second data word can be withdrawn from memory, the 0 position of which is to be sent to FF8–21** for eventual transfer to the data subset.

The Buffer Request signal is applied to $\overline{A}$7–37 which thereby makes high the output of I7–38. If the current computer program is between instruction cycles, or is in either the memory cycle SC0 or SC3 of an instruction cycle, $\overline{A}$7–40 can be enabled at CP1 of T7 time of said SC0 or SC3 cycle in order to set FF7–42. On the other hand, if the current computer program is in the middle of an instruction cycle other than during SC0 or SC3, FF7–42 cannot be set until one of these two memory cycles is reached, or until the end of the instruction cycle occurs. When FF7–42 is finally enabled, it immediately generates a low Buffer Grant signal from $\overline{A}$7–46. When applied to I8–48, this signal causes $\overline{A}$8–41 to clear FF8–39 at the next following CP4 to thereby terminate the Buffer Request signal and make low the output of I7–38. Consequently, FF7–42 remains set to 1 for one memory cycle until the next following time T7 when it is cleared at CP1 by $\overline{\text{A}}$7–43. As long as FF7–42 is set, however, the Buffer Grant signal remains applied to FIGURE 8 so as to cause $\overline{\text{A}}$8–47 to set FF8–46 at CP4 of time T7 of the repeated memory cycle. By this time the memory has been referenced and the second data word withdrawn and placed into the Z register. Thus, the setting of FF8–46 makes high the output of $\overline{\text{O}}$8–25. $\overline{\text{A}}$8–22 is now enabled at the next following CP2 to clear FF8–21 of its previous first data bit (assumed here to be 1) with $\overline{\text{A}}$8–23 being enabled at the next following CP3 to enter the second data bit into FF8–21 from the 0 stage of the Z register. This second data bit has been assumed to be 0 and is so indicated in FIGURE 11. This bit remains in FF8–21 until sampled by the leading edge of the next negative excursion of Clock–2 (corresponding to the leading edge of a positive excursion of the Send Clock signal for synchronous operation).

The memory address from which this second data bit is taken will be either 0070 or 0066, according to whether the *a* designator of the previously executed Repeat instruction calls for the incrementing or decrementing of the sequential operand addresses. A third possibility is that there will be no address modification at all if said *a* designator=0. Also, the $R_K$ count must be reduced by 1 for this second data transfer. These functions are accomplished as follows. When FF7–42 is in its condition, $\overline{\text{A}}$7–55 is enabled during T1 of the first repeated memory cycle to cause $\overline{\text{A}}$7–57 to clear the S register of whatever address it might have therein relating to the current instruction of the interrupted computer program. $\overline{\text{A}}$7–58 is then enabled for the entire next following T2 time to produce the $\underline{R+1}$ To S signal which, when applied to the $R+1$ Adder in FIGURE 6, causes $\overline{\text{A}}$ gates 6–82 through 6–69 to place into the S register the address of the memory location holding said second data bit word. Since the R register has been assumed to be holding 0067 or 7710 (depending on the states of flip-flops 7–18 and 7–19) the new octal number placed into S register at this time is either 0070 or 0066. After the R register so generates the new S register address for this second data word transfer, the count in the $R_K$ register must then be decremented by 1 in the following manner. During T3 of the repeated memory cycle, $\overline{\text{A}}$7–49 generates the signals Clear R–1 and $R'_K$ To R to thereupon cause the R register to first be cleared and the 1's complement of the $R_K$ value then entered therein. This $R_K$ value has been assumed to be 005, placed therein by the Repeat instruction, so that the value entered into R register is 772 (octal). During T5 of the repeated memory cycle, $\overline{\text{A}}$7–48 clears $R_K$ of its previous 005 count and then transfers the true value 004 from the $R+1$ Adder at CP1 time. Subsequent to this transfer, the R register must be cleared once more in order to receive the S register address for use in the next following third data transfer. This latter function is provided during the repeated memory cycle by $\overline{\text{O}}$7–51 being high, due to the low output from $\overline{\text{A}}$7–44. Consequently, $\overline{\text{A}}$7–52 at T6 time clears the R register so that one of the two $\overline{\text{A}}$ gates, 7–53 or 7–54, is subsequently enabled to enter either the complement value or the true value of the S register into the R register. The R register then contains a value 0070 or 0066, depending upon whether the operand address is to be incremented or decremented for each data transfer, respectively.

The second data bit of assumed 0 value now resides in FF8–21. When the leading negative edge of Clock–2 once again appears, this means that the data subset has accepted said second data bit. FF8–39 is once again set on to initiate a Buffer Request, whereupon the current computer program is interrupted for one memory cycle as has previously been described. The third 7-bit data word from address 0071 (or 0065) is now withdrawn, with the lowest bit therein in position 0 of the Z register being sent to FF8–21 to there await subsequent sampling by the data subset. Furthermore, the $R_K$ register value is once again decremented to the octal value of 003. When the data subset has acquired said third data bit, a Buffer Request signal is again initiated and the fourth 7-bit data word is withdrawn from the memory address (either 0072 or 0064) while the $R_K$ counter is decremented to 002. The lowest order bit of said fourth memory data word is also subsequently sampled by the subset, thereby initiating another Buffer Request signal which withdraws a fifth data word from memory from location 0073 (or 0063), and also reduces the $R_K$ register value to 001. The position 0 bit of this fifth memory data word is sent to FF8–21 where it is finally accepted by the data subset. This initiates another Buffer Request signal which automatically causes a sixth 7-bit data word to be withdrawn from memory location 0074 (or 0062) during the fifth memory cycle to be repeated in this buffer operation. Also, the value in the $R_K$ register is now decremented to 0 by time T6 of this fifth repeated memory cycle. $\overline{\text{A}}$4–32 is now able to produce a low output which in turn is inverted by I4–33 and applied to $\overline{\text{A}}$7–36 and $\overline{\text{A}}$7–60. $\overline{\text{A}}$7–60 is clocked with CP3 to set stage 6 in the Interrupt (I) Register in order to change the computer program level to level 6. $\overline{\text{A}}$7–36 is enabled at CP4 during T7 to thereby clear FF7–25 and so terminate the buffer operation.

When the Interrupt program level 6 is now entered, an Enter Channel 1 instruction ($f=10$) with $a^*=0$ is subsequently acquired therefrom and executed in order to clear flip-flops 8–10 and 8–11. This is performed when the Channel 1 Start signal is applied to I8–12, since $\overline{\text{A}}$8–14 clears said flip-flops at CP2 to thus terminate the Request To Send and (New Sync) signals. $\overline{\text{A}}$8–14 also clears FF8–29 to disconnect the output of FF8–21 from the Send Data line.

Since the above last described operations, commencing with the fifth repeated memory cycle, occur normally within but a few microseconds following the transfer of the fifth data bit to the data subset, the next following negative half cycle of Clock–2 fails to transmit a sixth data bit from said sixth memory word to the subset. However, for some data subset units, a period of at least 1 millisecond must be provided between the transmittal of the final fifth data bit thereto, and the termination of the Request To Send signal. If such a time delay is required, the program is written in a slightly altered fashion as follows. The initial count placed into $R_K$ from the *b y* designators of the Repeat instruction is now one less than the number of data bit transfers required. In the example just described, $R_K$ would therefore initially be set to 004 rather than 005. This means that during the fourth repeated memory cycle, wherein the final fifth data bit from memory is transferred to FF8–21, the $R_K$ count goes to 0. This causes an immediate jump to level 6 of the program and further clears FF7–25 so that no further Buffer Requests are possible from FF8–39, and hence, there will not be any fifth repeated memory cycle during which time a sixth data bit would be sent to FF8–21. However, since the fifth data bit cannot be sent to the subset for another ½ millisecond or so, it would not do to immediately acquire and execute from program level 6 the housekeeping Enter Channel 1 instruction with $a^*=0$, since FF8–29 must remain on until the fifth data bit is at last accepted by the data subset via $\overline{\text{A}}$8–28. By well known programming techniques, it is possible to write the interrupt level 6 program in a manner to delay the acquisition of said last named Enter Channel 1 instruction until more than 1 millisecond following the transfer of the fifth final data bit to the data subset.

FIGURE 12 is a timing diagram illustrating the operation of the invention for a Receive mode of transmission, i.e., one wherein the data subset transmits in serial fashion a number of bits to be entered into the 0 position of successive computer memory addresses. Assume first that the circuit of FIGURE 8 is in its quiescent state wherein all flip-flops are in their cleared (0) condition. This includes FF8–50 and FF8–51, since both inputs to $\overline{O}$8–52 will be high for either the FIGURE 9 or FIGURE 10 clock generating circuit. When the data subset is ready to commence transmission, it applies a high Carrier On signal to driver 8–44, here assumed to be applied at some CP3 time of the internal computer clock. If the non-synchronous clock generating circuit of FIGURE 9 is employed, the high Carrier On signal raises one input to $\overline{A}$9–13. However, the signal potential on the Receive Data line from the data subset must also change from its normally low potential to a high value before $\overline{A}$9–13 is enabled to set FF9–12 and thus begin operation of multivibrator 9–10. On the other hand, if the synchronous circuit of FIGURE 10 is employed, then the high Carrier On signal applied to $\overline{A}$10–12 permits the pass through of the Receive Clock signal from the data subset in the event that FF8–10 is cleared to 0, which is assumed to be the case here since the FIGURE 8 circuit is presently in its non-operating condition.

Once either FIGURE 9 or FIGURE 10 commences to generate active clock signals, the Clock–2 signal first goes low and Clock–1 simultaneously goes high. At the next following CP4, FF8–50 is set to 1 and remains in this condition for four CP times, being turned off at the next following CP4. FF8–51 is also set to 1 at CP2 following the setting of FF8–50, and it will remain in a 1 condition until Clock–2 goes positive. While FF8–50 is temporarily in its 1 condition, the output of $\overline{A}$8–60 goes low because of the now positive Clock–1 applied thereto, coupled with the presence of $a^*=0$ in flip-flops 8–10 and 8–11. The output of $\overline{A}$8–60 is clocked at CP2 by $\overline{A}$8–63 to set stage 7 in the I register. This changes the program level, in which the computer is currently operating, to level 7 in order to withdraw instructions therefrom. The first such instruction is a Repeat instruction (function code=16) with an $a$ designator of either 0, 1 or 2. This Repeat instruction is executed to set up circuits in FIGURE 7 as has been before described in connection with the Send Data mode timing diagram shown in FIGURE 11. The second instruction withdrawn from the level 7 program is an Enter Channel 1 instruction ($f=10$) with $a^*=2$, thus indicating a Receive mode of transmission. Said Enter Channel 1 instruction is also executed and sets up FIGURE 7 and FIGURE 8 circuits in the manner heretofore described in connection with the Send operation. The $a^*=2$ bits are transferred into FF8–10 and FF8–11, such that the former remains clear while the latter is placed in its binary 1 condition. These operations occur at computer operating speed so that the execution of both instructions is completed during the said negative swing of the Clock–2 signal. The execution of this Enter Channel 1 instruction also causes a computer memory reference at its $\underline{Yb}$ address here assumed to be 006, in order to withdraw a 7-bit data word and place it into the Z register from whence the 0 stage bit is transferred to FF8–21. However, this particular data bit will not ultimately be transferred to the data subset, as is the case for a Send mode, since it is impossible to now turn on FF8–29. Said data bit from memory address 0066 will be instead erased just prior to the entry of the first data bit coming from the data subset.

It is therefore seen that by the time that the Clock–2 signal next goes positive, the Repeat and Enter Channel 1 instructions from interrupt level 7 will have already set up circuits in FIGURES 7 and 8, while FF8–21 contains a data bit value which is unimportant. For the purpose of this description, it is assumed that the start of said positive swing of Clock–2 (corresponding, in the case of synchronous operation, to the leading edge of the Receive Clock negative half cycle) occurs at CP3 such that at the next following CP4, FF8–50 is set to 1. $\overline{O}$8–26 now has all inputs positive so as to make its output low, which in turn makes high the outputs of $\overline{O}$8–25 and I8–27. At the next following CP2, FF8–21 is therefore cleared by $\overline{A}$8–22. When CP2 disappears, $\overline{A}$8–24 is then operative to place into FF8–21 the data bit value now appearing on the Receive Data line from the data subset. Thus, by CP3 time the first data bit to be transferred to the computer from the subset is now residing in FF8–21 and is here assumed to have a value of 1.

Before this first data bit, now stored in FF8–21, can be transferred into the computer memory, FF8–39 must be set to 1 by $\overline{A}$8–40 to initiate the Buffer Request signal required to interrupt a currently executed program instruction cycle. $\overline{A}$8–40 requires, among other inputs, a high output from $\overline{O}$8–52 coupled with a high output from the 1 output terminal of FF8–50. However, when said first subset data bit is entered into FF8–21 via $\overline{A}$8–24 the output from $\overline{O}$8–52 is low to prevent enabling of $\overline{A}$8–40 at this time. Thus, the Clock–2 signal must first swing back to its negative value (positive half cycle of the Receive Clock signal in synchronous operation) before FF8–39 can be enabled. When such occurs, FF8–50 is once again set to 1 for a short period of time and is concurrent with a now high output from $\overline{O}$8–52. This permits $\overline{A}$8–40 to set FF8–39 to 1 and generate a Buffer Request signal which in turn is applied to $\overline{A}$7–37. If this Buffer Request signal is generated while the current computer program is in either a SC0 or SC3 memory cycle of an instruction cycle (or is between instructions), then FF7–42 is set to 1 during T7 time. FIGURE 12 shows the operation of the circuits, commencing at the time that FF7–42 is set to 1, when the R register content 0066 is transferred through the $R+1$ Adder to the S register so as to place in the latter the octal value 0067 which is the address of the memory location in which the first data bit from the subset is to be placed. It may here be mentioned that if decrementing is called for, and the first data bit from the subset is to be placed into memory address 0067, the $\underline{Yb}$ designator of the Enter Channel 1 instruction must be 0070, rather than 0066. When the computer memory is referenced at this newly generated 0067 address, the 7-bit data word residing therein is withdrawn and placed into the Z register. However, just before said Z register content is restored back into memory location 0067, $\overline{A}$8–66 is switched during T3 by a CP4 pulse to clear Z register of the data word just extracted from memory. The Clear Z signal from the Command Generator unit is assumed to be high for this function. Since $\overline{A}$8–19 is now continuously low during a Receive operation (because of the 0 value in FF8–10 and the 1 state of FF7–25), a C1 Input Buffer signal is applied via I7–62 to $\overline{A}$7–61 and causes the emission of a low signal C to Z now applied to $\overline{A}$8–35. Furthermore, $\overline{A}$7–46 generates a continuous signal Channel 1 To Z during the time that FF7–42 is on, so that at CP1 of T4 during the first repeated memory cycle, $\overline{A}$8–33 gates the content of FF8–21 in to the 0 stage of the Z register. Thus, during the automatic restore operation of the computer memory, the first data bit from the data subset is transferred from Z register stage 0 into the 0 position of memory address 0067. FF8–46 also operates near the end of the repeated cycle to clear FF8–21 after said transfer to the Z register has been made, and further operates gates $\overline{A}$8–22 and $\overline{A}$8–23 to read back into FF8–21 the bit in Z0. Also during the repeated cycle, the 1's complement of the $R_K$ register value is read into R register and from thence to the $R+1$ Adder in order to decrement this count by one in order to keep track of the number of transfers. Thus, at the conclusion of the first repeated memory cycle, the $R_K$ register has contained therein an octal value of 004, and the R register contains either 0067 (which is the true value of the memory address) or 7710, which is the 1's complement value of the S register address in case decrementation is required.

When Clock–2 once again goes positive, $\overline{O}$8–26 has all positive inputs applied thereto so as to clear FF8–21 of its previous content and thus permit $\overline{A}$8–24 to enter into FF8–21 the second data bit from the data subset. At this time however, FF8–39 cannot be set but must wait for a negative Clock–2 signal. When set, FF8–21 requests a second repeated memory cycle during which time the second data bit in FF8–21 is transferred into Z register stage 0 and from thence to address location 0070 of memory (for incrementing) or 0066 for decrementing. Furthermore, $R_K$ is decremented by 1 to a value 003. The entry of third, fourth and fifth data bits from the data subset into FF8–21, and from there into the memory, occurs as described above. During the fifth repeated memory cycle during which the fifth data bit is transferred into the Z register, the $R_K$ counter content reduces to a value of 0. Thus, at the conclusion of said last named repeated memory cycle, $\overline{A}$7–36 operates to clear FF7–25 so as to terminate the buffer operation, while $\overline{A}$7–60 operates to set stage 6 of the I register in order to choose program level 6. This program level 6 contains a housekeeping Enter Channel 1 instruction ($f=10$), with $a^*=0$, which when executed, clears FF8–10 and FF8–11 so that the I/O Comm. unit can be ready for any new subsequent I/O requests.

While a preferred embodiment of the present invention has been shown and described, modifications may occur to those skilled in the art without departing from the novel principles defined in the appended claims.

The embodiments of the invention in which an inclusive property or privilege is claimed are defined as follows:

1. An information handling system comprising:

(a) first means having a plurality of individually selectable locations each comprising a group of N bit storage positions, said first means being responsive to a location selecting signal indication for providing simultaneous access to all said N storage positions of the selected location;

(b) second means having a single bit storage position and adapted for connection to a peripheral unit with a serial operating mode, said second means being responsive to a control signal indication for providing access to its said storage position;

(c) a group of N bit transfer means, each *n*th transfer means being operatively connected with the corresponding *n*th storage position of any first means location only when accessed, and a particular one of said transfer means being operatively connected with the second means storage position only when accessed;

(d) first control means operable to successively apply location selecting signal indications to said first means and to successively apply control signal indications to said second means so as to transfer only one serial train of bits between said first means and said second means; and (e) second control means for automatically inhibiting operation of said first control means after a predetermined number of bits have been transferred between said first means and said second means.

2. A system according to claim 1 wherein said first control means is operable to successively apply location selecting signals each of which selects a different location in said first means.

3. A system according to claim 1 wherein said first means is responsive to each said location selecting signal indication for reading bits in parallel from its said selected location to said N transfer means, and said second means is responsive to each said control signal indication for writing a bit from said particular transfer means into its said storage position.

4. A system according to claim 1 wherein said second means is responsive to each said control signal indication for reading a bit from its said storage position to said particular transfer means, and said first means is responsive to each said location selecting signal indication for writing bits in parallel from said N transfer means into its said selected location.

5. A system according to claim 1 wherein said second control means counts a number of times that said first control means generates a said location selecting signal indication.

6. An information handling system comprising:

(a) first means having a plurality of individually selectable locations each comprising a group of N bit storage positions, said first means being responsive to a location selecting signal indication for providing simultaneous access to all said N storage positions of the selected location in order to read bits therefrom in parallel;

(b) second means having a single bit storage position and adapted for connection to a peripheral unit with a serial mode of operation at a predetermined frequency, said second means being responsive to a first control signal indication for providing access to its said storage position in order to write therein a bit presented to said second means;

(c) a group of N bit transfer lines, each *n*th transfer line being connected with the corresponding *n*th storage position of each first means location so as to receive a bit read therefrom, and a particular one of said transfer lines being connected with said second means in order to present a bit thereto;

(d) first control means operable to periodically generate a second control signal indication at said predetermined frequency; and (e) second control means operating in response to each said second control signal indication for applying a location select signal indication to said first means, and for applying a said first control signal indication to said second means so as to transfer only one serial train of bits from said first means to said second means, said second control means being operable to successively apply location selecting signal indications each of which selects a different location in said first means.

7. A system according to claim 6, wherein is further included third control means for automatically inhibiting operation of said second control means after a predetermined number of bits have been transferred from said first means to said second means.

8. A system according to claim 7 wherein said third control means counts a number of times that said second control means generates a said location selecting signal indication.

9. An information handling system comprising:

(a) first means having a plurality of individually selectable locations each comprising a group of N bit storage positions, said first means being responsive to a location selecting signal indication for providing simultaneous access to all said N storage positions of the selected location in order to write therein in parallel a group of N bits presented to said first means;

(b) second means having a single bit storage position, said second means being responsive to a first control signal indication for providing access to its said storage position in order to write therein a bit presented to said second means, said second means being further responsive to a second control signal indication for providing access to its said storage position in order to read a bit therefrom;

(c) a group of N bit transfer lines, a particular one of which is connected with said second means so as to receive a bit read from said storage position, and with each *n*th transfer line being connected with the corresponding *n*th storage position of each said first means location in order to present N bits to said first means;

(d) a single bit transmission line connected with said second means in order to present a bit thereto, with said transmission line further being adapted for connection to a peripheral unit with a serial mode of operation at a predetermined frequency;

(e) first control means operable to generate a cyclic signal waveform having said predetermined frequency;

(f) second control means responsive to a predetermined phase of each said signal waveform cycle for applying a said first control signal indication to said second means; and (g) third control means responsive to a predetermined phase of each said signal waveform cycle for applying a location selecting signal indication to said first means and for applying a said second control signal indication to said second means so as to transfer only one serial train of bits from a peripheral unit to said first means via said second means.

10. A system according to claim 9 wherein said second control means and said third control means are responsive to different predetermined phases of each said signal waveform cycle.

11. A system according to claim 9 wherein said third control means is operable to successively apply location selecting signal indications each of which selects a different location in said first means.

12. A system according to claim 11 wherein is further included fourth control means for automatically inhibiting operation of said third control means after a predetermined number of bits have been transferred from a peripheral unit to said first means.

13. A system according to claim 12 wherein said fourth control means counts a number of times that said third control means generates a said location selecting signal indication.

14. A system according to claim 13 wherein said second control means and said third control means are responsive to different predetermined phases of each said signal waveform cycle.

15. In an information handling system wherein multi-bit data words can be stored, transferred and processed all in a bit parallel mode of operation according to the functions specified by successively appearing multi-bit program instruction words, the combination comprising:

(a) memory means having individually addressable locations each capable of holding a multi-bit data word in different bit order storage positions thereat, said memory means operating to selectively read or write a data word in bit parallel fashion at an addressed location therein;

(b) buffer means having a single bit storage position and adapted for connection to a peripheral unit having a bit serial mode of operation at a predetermined frequency;

(c) first means actuable to successively generate and apply sequential location addresses to said memory means;

(d) second means for counting each location address generated by said first means except the initial location address of a sequence;

(e) first control means responsive to an appearing first predetermined program instruction word at the time of its occurrence for setting an initial value into said second means from which said count can commence;

(f) second control means responsive to a later appearing different predetermined program instruction word at the time of its occurrence for causing said first means to generate an initial location address of a sequence;

(g) third control means responsive to said different predetermined program instruction word at the time of its occurrence for transferring a single bit in a predetermined direction between said buffer means and a predetermined bit order storage position of said initially addressed location in said memory means;

(h) fourth control means responsive at least in part to said different predetermined program instruction word for generating a cyclic signal waveform at said predetermined frequency;

(i) fifth control means conditioned by said different predetermined program instruction word for subsequent response to each signal waveform cycle in order to both actuate said first means to generate a successive different location address and to transfer a single bit in said predetermined direction between said buffer means and said predetermined bit order storage position of said differently addressed location in said memory means; and (j) sixth control means responsive to a predetermined value in said second means for deconditioning said fifth control means.

16. A system according to claim 13 wherein said third control means and said fifth control means are responsive to said different predetermined program instruction word for determining said direction of bit transfer.

17. A system according to claim 16 wherein is further included seventh control means conditioned only by a said different predetermined program instruction word specifying bit transfer from said buffer means to said memory means, for responding to each signal waveform cycle in order to write a bit in said buffer means storage position as received from a peripheral unit.

18. A system according to claim 17 wherein said fifth control means and said seventh control means each responds to a different phase of any given signal waveform cycle.

References Cited

UNITED STATES PATENTS

| | | | |
|---|---|---|---|
| 2,905,930 | 9/1959 | Golden | 340—172.5 |
| 3,161,763 | 12/1964 | Glaser | 340—172.5 |

ROBERT C. BAILEY, *Primary Examiner.*

G. D. SHAW, *Examiner.*